United States Patent
Kano et al.

(10) Patent No.: US 9,212,433 B2
(45) Date of Patent: Dec. 15, 2015

(54) POLYMETHYLPENTENE CONJUGATE FIBER OR POROUS POLYMETHYLPENTENE FIBER AND FIBER STRUCTURE COMPRISING SAME

(71) Applicant: TORAY INDUSTRIES, INC., Tokyo (JP)

(72) Inventors: Hidekazu Kano, Mishima (JP); Shogo Hamanaka, Mishima (JP); Yoshitaka Aranishi, Mishima (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/387,025

(22) PCT Filed: Mar. 7, 2013

(86) PCT No.: PCT/JP2013/056293
§ 371 (c)(1),
(2) Date: Sep. 22, 2014

(87) PCT Pub. No.: WO2013/141033
PCT Pub. Date: Sep. 26, 2013

(65) Prior Publication Data
US 2015/0051308 A1    Feb. 19, 2015

(30) Foreign Application Priority Data

Mar. 23, 2012 (JP) ................................. 2012-067501
Mar. 23, 2012 (JP) ................................. 2012-067502
Sep. 27, 2012 (JP) ................................. 2012-213985

(51) Int. Cl.
| | |
|---|---|
| C04B 24/38 | (2006.01) |
| D01F 8/06 | (2006.01) |
| D01F 6/04 | (2006.01) |
| D01D 5/247 | (2006.01) |
| D01D 5/36 | (2006.01) |

(52) U.S. Cl.
CPC *D01F 8/06* (2013.01); *D01D 5/247* (2013.01); *D01D 5/36* (2013.01); *D01F 6/04* (2013.01); *D10B 2201/28* (2013.01); *D10B 2201/30* (2013.01); *D10B 2321/022* (2013.01); *D10B 2321/06* (2013.01); *D10B 2321/08* (2013.01); *D10B 2321/121* (2013.01); *D10B 2331/02* (2013.01); *D10B 2331/041* (2013.01); *D10B 2331/042* (2013.01); *D10B 2401/10* (2013.01)

(58) Field of Classification Search
CPC ............ D01D 5/247; D01D 5/36; D01F 6/04; D01F 8/06; D10B 2401/10; D10B 2201/28; D10B 2321/08; D10B 2331/042; D10B 2331/041; D10B 2331/02; D10B 2321/01
See application file for complete search history.

(56) References Cited

U.S. PATENT DOCUMENTS

| | | | | |
|---|---|---|---|---|
| 6,284,680 B1 * | 9/2001 | Aikawa et al. | ........... | D04H 1/42 442/340 |
| 2002/0150756 A1 | 10/2002 | Tanaka et al. | | |

FOREIGN PATENT DOCUMENTS

| | | |
|---|---|---|
| CN | 1464080 A | 12/2003 |
| JP | 4-272219 A | 9/1992 |
| JP | 9-157960 A | 6/1997 |
| JP | 2002-220741 A | 8/2002 |
| JP | 2005-281882 A | 10/2005 |

* cited by examiner

*Primary Examiner* — Nathan M Nutter
(74) *Attorney, Agent, or Firm* — Birch Stewart Kolasch & Birch, LLP

(57) ABSTRACT

Provided are a polymethylpentene conjugate fiber, which is capable of imparting to a lightweight polymethylpentene fiber an ability to develop a vivid and deep color, and a porous polymethylpentene fiber, which has a lightweight, a high pore diameter uniformity and a high porosity retention ratio against an external force, said polymethylpentene conjugate fiber and said porous polymethylpentene fiber being appropriately usable as a fiber structure for woven knitted goods, non-woven fabrics, yarns, cotton waddings, etc. The polymethylpentene conjugate fiber is characterized by having an island-in-sea structure wherein the sea component comprises a polymethylpentene-based resin and the island component comprises a thermoplastic resin. The porous polymethylpentene fiber, which comprises a polymethylpentene-based resin, is characterized in that the coefficient of variation (CV) of pore diameter at the fiber cross section is 1-50%.

20 Claims, 1 Drawing Sheet

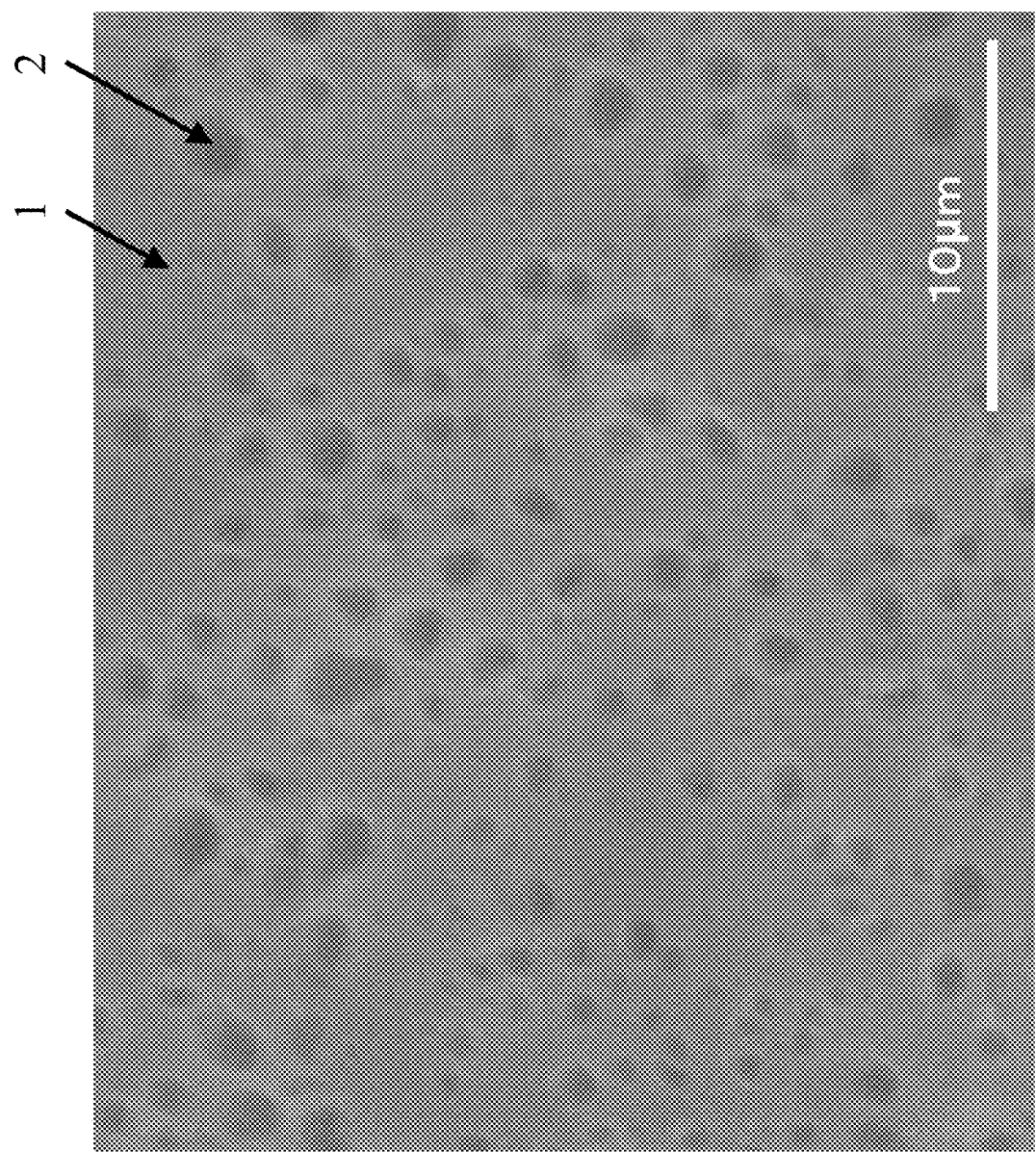

POLYMETHYLPENTENE CONJUGATE FIBER OR POROUS POLYMETHYLPENTENE FIBER AND FIBER STRUCTURE COMPRISING SAME

TECHNICAL FIELD

The present invention relates to polymethylpentene conjugate fiber and porous polymethylpentene fiber. More specifically, the invention relates to polymethylpentene conjugate fiber in which the lightweight polymethylpentene fiber has deep, vivid colors. It also relates to porous polymethylpentene fiber that is very light in weight, highly uniform in pore size, and high in pore resistance to external force. Polymethylpentene conjugate fiber and porous polymethylpentene fiber that can be obtained according to the present invention can be adopted favorably as fiber structures such as woven and knitted fabrics, nonwoven fabrics, spun yarns, and wadding.

BACKGROUND ART

Polyethylene fiber and polypropylene fiber, which fall under the category of polyolefin fiber, are light in weight and high in chemical resistance, but have the disadvantage of low heat resistance due to low melting points and also have the disadvantage of being difficult to dye due to the absence of polar functional groups. These defects make them unsuitable as clothing material and accordingly they are currently used in a limited range of applications including interior materials such as tile carpets, household carpets, and automobile mats, and general materials such as ropes, protective nets, filter fabrics, narrow tapes, braids, and chair upholstery.

Polymethylpentene is also a polyolefin based polymer, but different from polyethylene or polypropylene in that polymethylpentene is low in specific gravity and very light in weight as compared to polyethylene and polypropylene. Furthermore, being higher in heat resistance than other polyolefins due to a higher melting point and softening point, it can be ironed and is expected to serve as material intended for use at high temperatures. However, it is difficult to dye like other polyolefin based fibers, still leaving problems in applying to clothing applications.

Adding a pigment is a simple dyeing method for polyolefin based fibers. The use of a pigment, however, cannot serve effectively to develop vivid colors as compared to the use of a dye, and there is the disadvantage that pigments tend to stiffen fibers, leading to products with low softness.

As a dyeing method to replace the use of pigments, there is a proposal of surface modification of polyolefin based fibers. For example, Patent document 1 describes an attempt at improving dyeing properties through surface modification of polyolefin based fibers by performing ozone treatment or ultraviolet ray irradiation to cause graft copolymerization of vinyl compounds.

In addition, there are proposals of techniques that combine a polyolefin with poor dyeing properties with dyeable resin to form a composite material. Patent document 2 and Patent document 3, for example, propose core-sheath type conjugate fibers composed mainly of polymethylpentene as sheath component and polyester or polyamide as core component.

General methods relating to the lightening of fibers, on the other hand, include the formation of hollow parts and pores. Hollow parts and pores contain air and therefore serve to develop good functions such as heat insulation and cushioning properties as well as lightness. Hollow yarns can be produced easily by melt spinning but have the disadvantage that hollow parts can be deformed or destroyed during processing steps such as false-twisting and twining.

Various proposals have been made to provide methods for forming pores in fiber. In Patent document 4, for example, polyolefin fiber is heat-treated and then stretched to form pores. In this proposal, polyolefin is crystallized by heat treatment, and crystalline parts and amorphous parts are separated at their boundaries by stretching to form pores.

In Patent document 5, a polyolefin composition composed of polyolefin and fine particles is processed into fiber, which is then stretched to form pores. In this proposal, pores are formed by stretching to separate polyolefin and fine particles at their boundaries.

In Patent document 6, a polyolefin composition composed of polyolefin and paraffin wax is subjected to a fiber production process to produce a sea-island fiber, and then the paraffin wax, i.e. island component, is dissolved out with a solvent to form pores.

PRIOR ART DOCUMENTS

Patent Documents

Patent document 1: Japanese Unexamined Patent Publication (Kokai) No. HEI 7-90783
Patent document 2: Japanese Unexamined Patent Publication (Kokai) No. HEI 9-87927
Patent document 3: Japanese Unexamined Patent Publication (Kokai) No. HEI 9-157960
Patent document 4: Japanese Unexamined Patent Publication (Kokai) No. HEI 6-246140
Patent document 5: Japanese Unexamined Patent Publication (Kokai) No. HEI 10-259519
Patent document 6: Japanese Unexamined Patent Publication (Kokai) No. HEI 4-18112

SUMMARY OF THE INVENTION

Problems to be Solved by the Invention

The method to develop colors in polyolefin based fibers described in Patent document 1, however, requires a long processing time for ozone treatment and ultraviolet ray irradiation, leading to low productivity and difficulties in industrialization.

The methods proposed in Patent documents 2 and 3, furthermore, can form core-sheath type conjugate fibers containing dyeable resin as core component so that colors can be developed in the fibers, but such colors are not sufficiently vivid or deep.

The first object of the present invention is to solve the above-mentioned problems with the conventional techniques and produce lightweight polymethylpentene fiber with deep, vivid color developing property to provide polymethylpentene conjugate fiber that can be adopted favorably as fiber structures such as woven and knitted fabrics, nonwoven fabrics, spun yarns, and wadding.

The methods relating to the lightening of fibers described in Patent document 4, on the other hand, have the disadvantages that the fiber is easily broken as it is stretched and that the pore size is different between the outer layers and inner layers in the stretched fiber, leading to difficulty in controlling the pore size.

The method described in Patent document 5 has the disadvantages that thread breakage takes place easily during melt spinning due to coagulation of fine particles and that pore size variations occur easily during stretching in addition to thread breakage. Furthermore, there is also the disadvantage that the porous fiber produced by the stretching contains residual fine particles.

In the case of the method proposed in Patent document 6, furthermore, since paraffin wax commonly has a melting point of 50 to 70° C., paraffin wax will have an excessively high flowability at a spinning temperature suitable for polymethylpentene when composite material is produced through its melt spinning with polyolefin having a high melting point, such as polymethylpentene, making it difficult to control the dispersion diameter of the paraffin wax, i.e., island component. As a result, porous fiber produced by dissolving out the island component is not sufficiently uniform in pore size and the pores are easily deformed when an external force is applied.

The second object of the present invention is to solve the above-mentioned problems with the conventional techniques and produce porous polymethylpentene fiber that is very light in weight, highly uniform in pore size, and high in pore resistance to external force and accordingly can be adopted favorably as fiber structures such as woven and knitted fabrics, nonwoven fabrics, spun yarns, and wadding.

Means of Solving the Problems

The first object of the present invention can be met by polymethylpentene conjugate fiber having a sea-island structure that includes polymethylpentene based resin as sea component and thermoplastic resin as island component.

The thermoplastic resin is preferably formed of one or more compounds selected from the group consisting of polyester, polyamide, thermoplastic polyacrylonitrile, thermoplastic polyurethane, and cellulose derivatives.

For the fiber to be adopted favorably, furthermore, it is preferable that the coefficient of variation CV of the dispersion diameter of the island domains in the fiber cross section is in the range of 1 to 50%, that the content ratio (by weight) of the sea component to the island component is in the range of 20/80 to 99/1, that the dispersion diameter of the island domains in the fiber cross section is in the range of 0.001 to 2 μm, and that the specific gravity of the fiber in the range of 0.83 to 1.1.

The second object of the present invention can be met by a porous polymethylpentene fiber formed of polymethylpentene based resin in which the coefficient of variation CV of the diameter of the pores in the fiber cross section is 1 to 50%.

It is preferable that the average diameter of the pores in the fiber cross section is 0.001 to 2 μm, that the porosity of the fiber is 0.1 to 70%, and that the specific gravity of the fiber is 0.25 to 0.80. The second object of the present invention can be met favorably by adopting a porous polymethylpentene fiber production method in which polymethylpentene conjugate fiber having a sea-island structure including polymethylpentene based resin as sea component and thermoplastic resin as island component is produced, followed by dissolving out at least part of the island component.

The method can be adopted favorably to produce a fiber structure formed at least partly of the polymethylpentene conjugate fiber or the porous polymethylpentene fiber.

Advantageous Effect of the Invention

The present invention serves to provide polymethylpentene conjugate fiber that is formed of very lightweight polymethylpentene fiber and at the same time able to have deep, vivid colors. The present invention also serves to provide porous polymethylpentene fiber that is very light in weight, highly uniform in pore size, and high in pore resistance to external force. If processed into a fiber structure such as woven and knitted fabrics, nonwoven fabrics, spun yarns, and wadding, the polymethylpentene conjugate fiber and porous polymethylpentene fiber produced according to the present invention can be used favorably as clothing material and in a wide range of applications that require lightness and color developing property in addition to interior and general material applications where conventional polyolefin based fibers have been used.

BRIEF DESCRIPTION OF THE DRAWINGS

FIG. 1 is a photograph that is given as an alternative to a diagram to show a fiber cross section of porous polymethylpentene fiber according to the present invention.

DESCRIPTION OF PREFERRED EMBODIMENTS

The polymethylpentene conjugate fiber according to the present invention has a sea-island structure containing polymethylpentene based resin as sea component and thermoplastic resin as island component. The polymethylpentene based resin of the sea component is a resin that is high in transparency and low in refractive index and accordingly, good colors can be developed in the inner parts of the fiber by dyeing the thermoplastic resin of the island component, making it possible to form polymethylpentene conjugate fiber that contains polymethylpentene based resin and has color developing property. Furthermore, unlike the conventionally proposed core-sheath type structure that is composed of polymethylpentene as sheath component and dyeable resin as core component, the sea-island structure according to the present invention contains a plurality of, preferably a large number of, dyed island domains arranged in a sea domain so that transmitted beams through the island domains and reflected beams from the island domains are mixed randomly to give deep, vivid colors. In addition, unlike the core-sheath type structure, the island domains of dyeable resin are scattered over the fiber cross section to achieve higher color developing property as compared to the core-sheath type structure with the same content ratio. The sea-island structure according to the present invention may be a sea-island structure produced by multi-component fiber spinning in which island domains are located continuously in the fiber length direction, and in this case the number of island domains in the polymethylpentene conjugate fiber is preferably eight or more. Alternatively, this sea-island structure may be a sea-island structure that is produced through polymer alloy type spinning of a resin to form the sea and a resin to form islands and in which the island domains have finite lengths in the fiber length direction.

The porous polymethylpentene fiber according to the present invention is formed of polymethylpentene based resin and the coefficient of variation CV of the pore diameter in the fiber cross section is in the range of 1 to 50%. By making the polymethylpentene fiber porous, the polymethylpentene based resin, which originally has a low specific gravity, can be made still lighter and furthermore, can obtain a good heat insulation function and cushioning function. Furthermore, if the coefficient of variation CV of the pore diameter in the fiber cross section is in the range of 1 to 50%, it is possible to obtain porous polymethylpentene fiber with high uniformity in pore size. Accordingly, it becomes possible to depress the pore deformation and collapse and fiber rupture due to stress concentrations, leading to the formation of porous polymethylpentene fiber with a high pore resistance to external force as well as high durability.

Useful polymethylpentene based resin for the present invention include 4-methyl-1-pentene based polymers, which may be either a homopolymer of 4-methyl-1-pentene or a copolymer of 4-methyl-1-pentene with other α-olefins. Such a copolymer may contain only one or a plurality of these other α-olefins (hereinafter occasionally referred to simply as α-olefins).

These α-olefins preferably contain 2 to 20 carbon atoms and the molecular chains of the α-olefins may be either straight chains or branched chains. Specific examples of these α-olefins include, but not limited to, ethylene, propylene, 1-butene, 1-pentene, 1-hexene, 1-octene, 1-decene, 1-dodecene, 1-tetradecene, 1-hexadecene, 1-octadecene, 1-eicosene, 3-methyl-1-butene, 3-methyl-1-pentene, 3-ethyl-1-pentene, and 3-ethyl-1-hexene.

In a polymethylpentene based resin to be used for the present invention, the copolymerization ratio of α-olefins is preferably 20 mol % or less. A copolymerization ratio of α-olefins of 20 mol % or less is preferable because in that case, it is possible to obtain polymethylpentene conjugate fiber and porous polymethylpentene fiber that have good mechanical characteristics and high heat resistance. The copolymerization ratio of α-olefins is more preferably 15 mol % or less and still more preferably 10 mol % or less.

Polymethylpentene based resin used for the present invention preferably has a melting point of 200 to 250° C. Polymethylpentene based resin with a melting point of 200° C. or more is preferable because in that case, the resulting polymethylpentene conjugate fiber and porous polymethylpentene fiber will have high heat resistance. On the other hand, the use of polymethylpentene based resin with a melting point of 250° C. or less is preferable because in that case, high spinning operability will be ensured when conjugate fiber is produced through melt spinning with thermoplastic resin. The polymethylpentene based resin more preferably has a melting point of 210 to 245° C., still more preferably 220 to 240° C.

Polymethylpentene based resin used for the present invention preferably has a melt flow rate (MFR) of 5 to 200 g/10 min as measured under the conditions of a temperature of 260° C. and a load of 5.0 kg according to ASTM D1238. The use of polymethylpentene based resin with a melt flow rate 5 g/10 min or more is preferable because in that case, increased high-temperature flowability and high molding processability are ensured. On the other hand, the use of polymethylpentene based resin with a melt flow rate of 200 g/10 min or less is preferable because in that case, polymethylpentene conjugate fiber and porous polymethylpentene fiber with good mechanical characteristics are obtained. The polymethylpentene based resin more preferably has a melt flow rate of 10 to 190 g/10 min, still more preferably 20 to 180 g/10 min.

Polymethylpentene based resin used for the present invention may be one that has been modified through various methods by adding minor additives. Specific examples of such minor additives include, but not limited to, compatibilizer, plasticizer, ultraviolet absorber, infrared ray absorbent, fluorescent brightening agent, mold releasing agent, antibacterial agent, nuclear formation agent, thermal stabilizer, antioxidant, antistatic agent, color protection agent, adjustor, delustering agent, antifoam agent, antiseptic agent, gelatinizer, latex, filler, ink, coloring agent, dye, pigments, and perfume. These minor additives may be used singly, or a plurality thereof may be used in combination.

There are no specific limitations on the thermoplastic resin to be used to produce the polymethylpentene conjugate fiber according to the present invention and it can be adopted favorably as long as it can be melt-spun in combination with polymethylpentene based resin to form conjugate fiber having a sea-island structure and can be dyed with a dye. Specific examples of such thermoplastic resin to be used for the polymethylpentene conjugate fiber according to the present invention include, but not limited to, polyester, polyamide, thermoplastic polyacrylonitrile, thermoplastic polyurethane, modified polyolefin, polyvinyl chloride, and cellulose derivatives. Polyester, polyamide, thermoplastic polyacrylonitrile, thermoplastic polyurethane, and cellulose derivatives are preferable because of good color developing properties, of which polyester and polyamide can be adopted favorably because of good mechanical characteristics.

There are no specific limitations for the favorable adoption of the thermoplastic resin to be used to produce the porous polymethylpentene fiber according to the present invention as long as it can be melt-spun in combination with polymethylpentene based resin to form conjugate fiber having a sea-island structure and the thermoplastic resin of the island component can be dissolved out with a solvent. In the case where part of the island component is left undissolved, there are no specific limitations for the favorable adoption of the thermoplastic resin as long as it is dyeable with a dye. Specific examples of such thermoplastic resin to be used for the porous polymethylpentene fiber according to the present invention include, but not limited to, polyester, polyamide, polyvinyl alcohol, polyalkylene glycol, polyolefin, polystyrene, and cellulose derivatives. Of these, polyester and polyamide can be adopted favorably because the state of dispersion with polymethylpentene based resin and the rate of dissolving-out from polymethylpentene conjugate fiber can be controlled easily by changing the copolymerization component and the copolymerization ratio and also because good color developing property can be maintained in the case where part of the island component are left undissolved.

Specific examples of such polyester include, but not limited to, aromatic polyesters such as polyethylene terephthalate, polypropylene terephthalate, polybutylene terephthalate, and polyhexamethylene terephthalate; aliphatic polyesters such as polylactic acid, polyglycolic acid, polyethylene adipate, polypropylene adipate, polybutylene adipate, polyethylene succinate, polypropylene succinate, polybutylene succinate, polyethylene sebacate, polypropylene sebacate, polybutylene sebacate, and polycaprolactone, and copolymerized polyesters produced by copolymerizing these polyesters with copolymerization components. Of these, polylactic acid can be adopted favorably to produce polymethylpentene conjugate fiber because it has a low refractive index and ensures good color developing property when dyed. Polylactic acid and copolymers of polyethylene terephthalate with 5-sodium sulfoisophthalic acid can also be adopted favorably to produce porous polymethylpentene fiber because they have high spinning operability, shows a high rate of dissolving-out into an alkali aqueous solution, and ensures good color developing property in the case where part of the island component are left undissolved.

Specific examples of such copolymerization components to be copolymerized with polyester include, but not limited to, aromatic dicarboxylic acids such as phthalic acid, isophthalic acid, terephthalic acid, 5-sodium sulfoisophthalic acid, 1,5-naphthalene dicarboxylic acid, 2,6-naphthalene dicarboxylic acid, 2,2'-biphenyl dicarboxylic acid, 3,3'-biphenyl dicarboxylic acid, 4,4'-biphenyl dicarboxylic acid, anthracene dicarboxylic acid; aliphatic dicarboxylic acids such as malonic acid, fumaric acid, maleic acid, succinic acid, itaconate, adipic acid, azelaic acid, sebacic acid, 1,11-undecane dicarboxylic acid, 1,12-dodecane dicarboxylic acid, 1,14-tetradecane dicarboxylic acid, 1,18-octadecane dicarboxylic acid, 1,2-cyclohexanedicarboxylic acid, 1,3-cyclohexanedicarboxylic acid, 1,4-cyclohexanedicarboxylic acid, dimer acid; aromatic diols such as catechol, naphthalene diols, and bisphenol; and aliphatic diols such as ethylene glycol, trimethylene glycol, tetramethylene glycol, hexamethylene glycol, diethylene glycol, polyethylene glycol, polypropylene glycol, neopentyl glycol, and cyclohexanedimethanol. These copolymerization components may be used singly, or two or more thereof may be used in combination.

Specific examples of such polyamide include, but not limited to, aromatic polyamides such as nylon 6T, nylon 9T, and nylon 10T; aliphatic polyamides such as nylon 4, nylon 6, nylon 11, nylon 12, nylon 46, nylon 410, nylon 66, and nylon 610; and copolymerized polyamides produced by copolymerizing these polyamides with copolymerization components.

Specific examples of such copolymerization components to be copolymerized with polyamide include, but not limited to, aromatic diamines such as meta-phenilene diamine, para-phenylene diamine, meta-xylylene diamine, and para-xylylene diamine; aliphatic diamines such as 1,2-ethylene diamine, 1,3-trimethylene diamine, 1,4-tetramethylene diamine, 1,5-pentamethylene diamine, 2-methyl-1,5-pentamethylene diamine, 1,6-hexamethylene diamine, 1,7-heptamethylene diamine, 1,8-octamethylene diamine, 1,9-nonamethylene diamine, 2-methyl-1,8-octamethylene diamine, 1,10-decamethylene diamine, 1,11-undecamethylene diamine, 1,12-dodecamethylene diamine, 1,13-tridecamethylene diamine, 1,16-hexadecamethylene diamine, 1,18-octadecamethylene diamine, 2,2,4-trimethyl hexamethylene diamine, piperazine, and cyclohexane diamine; aromatic dicarboxylic acids such as phthalic acid, isophthalic acid, terephthalic acid, 5-sodium sulfoisophthalic acid, 1,5-naphthalene dicarboxylic acid, 2,6-naphthalene dicarboxylic acid, 2,2'-biphenyl dicarboxylic acid, 3,3'-biphenyl dicarboxylic acid, 4,4'-biphenyl dicarboxylic acid, and anthracene dicarboxylic acid; and aliphatic dicarboxylic acids such as malonic acid, fumaric acid, maleic acid, succinic acid, itaconate, adipic acid, azelaic acid, sebacic acid, 1,11-undecane dicarboxylic acid, 1,12-dodecane dicarboxylic acid, 1,14-tetradecane dicarboxylic acid, 1,18-octadecane dicarboxylic acid, 1,2-cyclohexanedicarboxylic acid, 1,3-cyclohexanedicarboxylic acid, 1,4-cyclohexanedicarboxylic acid, and dimer acid. These copolymerization components may be used singly, or two or more thereof may be used in combination.

Examples of such thermoplastic polyacrylonitrile include copolymers of acrylonitrile with a copolymerization component.

Specific examples of such copolymerization components to be copolymerized with thermoplastic polyacrylonitrile include, but not limited to, acrylic acid esters such as methyl acrylate, ethyl acrylate, acrylic acid propyl, and butyl acrylate; methacrylic acid esters such as methyl methacrylate, ethyl methacrylate, propyl methacrylate, and butyl methacrylate; halo-olefins such as vinyl chloride, vinyl fluoride, vinylidene chloride, and vinylidene fluoride; vinyl amides such as acrylamide, methacrylamide, and vinyl pyrolidone; vinyl esters such as vinyl acetate and vinyl propionate; vinyl aromatic compounds such as styrene and vinyl pyridine; vinyl carboxylic acids such as acrylic acid and methacrylic acid; vinyl sulfonic acids such as p-styrene sulfonic acid, allyl sulfonic acid, and methallyl sulfonic acid; and salts of vinyl carboxylic acid or vinyl sulfonic acid such as sodium acrylate, sodium methacrylate, sodium p-styrene sulfonate, sodium allyl sulfonate, and sodium methallyl sulfonate. These copolymerization components may be used singly, or two or more thereof may be used in combination.

Specific examples of such thermoplastic polyacrylonitrile include, but not limited to, acrylonitrile-methyl acrylate copolymer, acrylonitrile-ethyl methacrylate copolymer, acrylonitrile-vinyl chloride copolymer, acrylonitrile-acrylamide copolymer, acrylonitrile-vinyl acetate copolymer, acrylonitrile-styrene copolymer, acrylonitrile-acrylic acid copolymer, acrylonitrile-sodium methacrylate copolymer.

Examples of such thermoplastic polyurethane include polymer compounds produced by three-component reaction of diisocyanate, polyol, and a chain extender.

Specific examples of such diisocyanate include, but not limited to, trimethylene diisocyanate, tetramethylene diisocyanate, hexamethylene diisocyanate, isophorone diisocyanate, 1,3-bis(isocyanate methyl)cyclohexane, 1,4-bis(isocyanate methyl)cyclohexane, 1,3-cyclohexane diisocyanate, 1,4-cyclohexane diisocyanate, 2,2'-diphenyl methane diisocyanate, 2,4'-diphenyl methane diisocyanate, 4,4'-diphenyl methane diisocyanate, 1,5-naphthalene diisocyanate, 2,4-toluene diisocyanate, and 2,6-toluene diisocyanate, diphenyl methane diisocyanate.

Specific examples of such polyol include, but not limited to, polyether polyol, polyester polyol, polycaprolactone polyol, and polycarbonate polyol. Polyether polyol can be produced by ring-opening addition polymerization of low molecular weight polyol or low molecular weight polyamine with alkylene oxide. Polyester polyol can be produced by condensation reaction or ester interchange reaction of low molecular weight polyol with multivalent carboxylic acid, multivalent carboxylic acid ester, multivalent carboxylic anhydride, or multivalent carboxylic acid halide. Polycaprolactone polyol can be produced by ring-opening polymerization of low molecular weight polyol with caprolactone. Polycarbonate polyol can be produced by addition polymerization of low molecular weight polyol with carbonate.

Specific examples of such low molecular weight polyol include, but not limited to, ethylene glycol, propylene glycol, 1,3-propanediol, 1,4-butanediol, 1,5-pentanediol, 1,6-hexanediol, cyclohexanediol, cyclohexanedimethanol, bisphenol, diethylene glycol, dipropylene glycol, glycerin, trimethylolpropane, pentaerythritol, diglycerin, xylitol, sorbitol, mannitol, and dipenta erythritol sucrose. Specific examples of such low molecular weight polyamine include, but not limited to, ethylene diamine, 1,3-propane diamine, 1,4-butane diamine, 1,6-hexamethylene diamine, 1,4-cyclohexane diamine, and hydrazine. Specific examples of such alkylene oxide include, but not limited to, ethylene oxide, propylene oxide, butylene oxide, and tetrahydrofuran. Specific examples of such multivalent carboxylic acid include, but not limited to, oxalic acid, malonic acid, fumaric acid, maleic acid, succinic acid, itaconic acid, adipic acid, phthalic acid, isophthalic acid, terephthalic acid, and dimer acid. Specific examples of such multivalent carboxylic acid esters include, but not limited to, methyl ester and ethyl ester of multivalent carboxylic acid. Specific examples of such multivalent carboxylic anhydride include, but not limited to, oxalic anhydride, succinic anhydride, maleic anhydride, phthalic anhydride, and trimellitic anhydride. Specific examples of such multivalent carboxylic acid halide include, but not limited to, oxalic acid dichloride and adipic acid dichloride. Specific examples of such caprolactone include, but not limited to, ε-caprolactone. Specific examples of such carbonate include, but not limited to, ethylene carbonate and dimethyl carbonate.

Specific examples of such chain extender include, but not limited to, ethane diols 1,2-propanediol, 1,3-propanediol, 1,4-butanediol, 1,6-hexanediol, diethylene glycol, and dipropylene glycol.

Such modified polyolefin is preferably a copolymer of α-olefin and a copolymerization component. Such polyolefin, furthermore, may be a homopolymer of α-olefin, or a copolymer of two or more kinds of α-olefin, or a copolymer of α-olefin with a copolymerization component. In terms of structural type, such copolymers may be, but not limited to, block copolymers or graft copolymers.

Such α-olefin preferably contains 2 to 20 carbon atoms and the molecular chain of the α-olefin may be either a straight chain or a branched chain. Specific examples of such α-olefin include, but not limited to, ethylene, propylene, 1-butene, 1-pentene, 1-hexene, 1-octene, 1-decene, 1-dodecene, 1-tetradecene, 1-hexadecene, 1-octadecene, 1-eicosene, 3-methyl-1-butene, 3-methyl-1-pentene, 4-methyl-1-pentene, 3-ethyl-1-pentene, and 3-ethyl-1-hexene. These α-olefins may be used singly, or two or more thereof may be used in combination.

Copolymerization components that can be adopted favorably for such modified polyolefin include unsaturated compounds that contain a polar functional group with high affinity with dyes. Furthermore, copolymerization components that can be adopted favorably for such polyolefin include unsaturated compounds that contain a polar functional group that works to increase the rate of dissolving-out from polymethylpentene conjugate fiber. Such polar functional group with high affinity with dyes or polar functional groups that work to increase the dissolving-out rate include carboxylic acid group, carboxylic anhydride group, carboxylate group, carboxylic acid ester group, and carboxylic acid amide group. Specific examples of such copolymerization components for modified polyolefin or polyolefin include, but not limited to, unsaturated carboxylic acids such as maleic acid, fumaric acid, itaconic acid, acrylic acid, and methacrylic acid; unsaturated carboxylic anhydrides such as maleic anhydride and itaconic anhydride; unsaturated carboxylates such as sodium methacrylate and sodium acrylate; unsaturated carboxylic acid esters such as vinyl acetate, vinyl propionate, methyl acrylate, ethyl acrylate, methyl methacrylate, and maleic acid monoethyl ester; and unsaturated carboxylic acid amides such as acrylamide and maleic acid monoamide. These copolymerization components may be used singly, or two or more thereof may be used in combination.

Specific examples of such modified polyolefin or polyolefin include, but not limited to, ethylene-maleic acid copolymer, ethylene-fumaric acid copolymer, ethylene-acrylic acid copolymer, ethylene-methacrylic acid copolymer, ethylene-acrylic acid-sodium methacrylate copolymer, ethylene-vinyl acetate copolymer, ethylene-ethyl acrylate copolymer, acrylic acid grafted polyethylene, maleic anhydride grafted polyethylene, maleic anhydride grafted polypropylene, maleic anhydride grafted ethylene-propylene copolymer, acrylic acid grafted ethylene-propylene copolymer, maleic acid grafted ethylene-propylene-norbornadiene copolymer, and acrylic acid grafted ethylene-vinyl acetate copolymer.

The polyvinyl chloride may be either a homopolymer of vinyl chloride or a copolymer of vinyl chloride and a copolymerization component.

Specific examples of such copolymerization components for polyvinyl chloride include, but not limited to, vinyl esters such as vinyl acetate and vinyl propionate; acrylic acid esters such as acrylic acid propyl and butyl acrylate; and olefins such as ethylene and propylene. These copolymerization components may be used singly, or two or more thereof may be used in combination.

A cellulose derivative is a compound formed by replacing at least part of the three hydroxyl groups existing in glucose units that constitute cellulose with other functional groups. Examples thereof include, but not limited to, single cellulose ester composed of cellulose and one ester group bonded thereto, mixed cellulose ester composed of cellulose and a plurality of ester groups bonded thereto, single cellulose ether composed of cellulose and one ether group bonded thereto, mixed cellulose ether composed of cellulose and a plurality of ether groups bonded thereto, and cellulose ether ester composed of cellulose and one or a plurality of ether groups and ester groups bonded thereto. There are no specific limitations on the degree of substitution of these cellulose derivatives, and a cellulose derivative with an appropriate degree of substitution may be selected from the viewpoint of its melt viscosity, thermoplasticity, and solubility in the solvent to be used for dissolving out the island component. If a cellulose derivative to be used does not show thermoplasticity, a plasticizer may be added to the cellulose derivative with the aim of improving its high temperature flowability.

Specific examples of such cellulose derivatives include, but not limited to, single cellulose esters such as cellulose acetate, cellulose propionate, cellulose butyrate, cellulose valerate, and cellulose stearate; mixed cellulose esters such as, cellulose acetate propionate, cellulose acetate butyrate, cellulose acetate valerate, cellulose acetate caproate, cellulose propionate butyrate, and cellulose acetate propionate butyrate; single cellulose ethers such as methyl cellulose, ethyl cellulose, propyl cellulose, hydroxymethyl cellulose, hydroxyethyl cellulose, hydroxypropyl cellulose, and carboxymethyl cellulose; mixed cellulose ethers such as methyl ethyl cellulose, methyl propyl cellulose, ethyl propyl cellulose, hydroxymethyl methyl cellulose, hydroxymethyl ethyl cellulose, hydroxypropyl methyl cellulose, hydroxyethyl methyl cellulose, and hydroxypropyl methyl cellulose; and cellulose ether esters such as methyl cellulose acetate, methyl cellulose propionate, ethyl cellulose acetate, ethyl cellulose propionate, propyl cellulose acetate, propyl cellulose propionate, hydroxymethyl cellulose acetate, hydroxymethyl cellulose propionate, hydroxyethyl cellulose acetate, hydroxyethyl cellulose propionate, hydroxypropyl cellulose acetate, hydroxypropyl cellulose propionate, carboxymethyl cellulose acetate, and carboxymethyl cellulose propionate.

Such polyvinyl alcohol may be either a homopolymer of vinyl alcohol or a copolymer of vinyl alcohol with a copolymerization component.

Specific examples of such copolymerization components for polyvinyl alcohol include, but not limited to, vinyl esters such as vinyl acetate, vinyl propionate and vinyl pivalate; vinyl carboxylic acids such as maleic acid, itaconic acid; vinyl carboxylic anhydrides such as maleic anhydride and itaconic anhydride; olefins such as ethylene and propylene; vinyl amides such as acrylamide, methacrylamide, and vinyl pyrolidone; and vinyl sulfonic acids such as p-styrene sulfonic acid, allyl sulfonic acid, and methallyl sulfonic acid. These copolymerization components may be used singly, or two or more thereof may be used in combination.

Specific examples of such polyalkylene glycol include, but not limited to, homopolymers such as polyethylene glycol, polypropylene glycol, and polytetramethylene glycol; and copolymers such as polyethylene glycol-polypropylene glycol copolymer and polyethylene glycol-polybutylene glycol copolymer.

Such polystyrene may be either a homopolymer of styrene or a copolymer of styrene with a copolymerization component. Specific examples of such copolymerization components for polystyrene include, but not limited to, unsaturated carboxylic acids such as maleic acid, fumaric acid, itaconic acid, acrylic acid, and methacrylic acid; unsaturated carboxylic anhydrides such as maleic anhydride and itaconic anhydride; unsaturated carboxylates such as sodium methacrylate and sodium acrylate; unsaturated carboxylic acid esters such as vinyl acetate, vinyl propionate, methyl acrylate, ethyl acrylate, methyl methacrylate, and maleic acid monoethyl ester; and unsaturated carboxylic acid amides such as acrylamide and maleic acid monoamide. These copolymerization components may be used singly, or two or more thereof may be used in combination.

Thermoplastic resin used for the present invention preferably has a melting point or a flow start temperature under heat in the range of 180 to 270° C. The use of thermoplastic resin with a melting point or a flow start temperature under heat of 180° C. or more is preferable because in that case, the thermoplastic resin does not undergo heat degradation during melt spinning for producing a composite structure with polymethylpentene based resin, leading to conjugate fiber and porous polymethylpentene fiber with good mechanical characteristics. The use of thermoplastic resin with a melting point of 270° C. or less is preferable because in that case, the polymethylpentene based resin does not undergo heat degradation during melt spinning for producing a composite structure with the thermoplastic resin, leading to polymethylpentene conjugate fiber and porous polymethylpentene fiber with good mechanical characteristics. The thermoplastic resin more preferably has a melting point of 190 to 265° C., still more preferably 200 to 260° C.

For the present invention, the melting point and flow start temperature under heat can be measured by the following method. The melting point of the aforementioned polymethylpentene based resin and the melting point of the above thermoplastic resin can be measured by using a differential scanning calorimeter (DSC) (for example, DSC7 differential scanning calorimeter manufactured by Perkin-Elmer). Specifically, a specimen of about 10 mg is heated from 30° C. to 280° C. in a nitrogen atmosphere at a heating rate of 15° C./min and maintained at 280° C. for 3 minutes to remove heat history from the specimen. Subsequently, it is cooled from 280° C. to 30° C. at a cooling rate of 15° C./min, maintained at 30° C. for 3 minutes, and heated from 30° C. to 280° C. at a heating rate 15° C./min, and the peak temperature of the endothermic peak observed during the second heating process is assumed to be its melting point (° C.). Here, three measurements are made for a specimen, and their average is taken as the melting point. However, if the peak width of the endothermic peak is larger than 50° C. or if the absorbed heat quantity of the endothermic peak is less than 5 J/g, it is assumed that the specimen does not show a melting point and the flow start temperature under heat is determined by the following method. Polymethylpentene based resin or thermoplastic resin that is vacuum-dried is subjected to measurement under a load of 2.16 kg using a flow tester (for example, CFT-500D flow tester manufactured by Shimadzu Corporation) having a die with a pore size of 1.0 mm and hole length of 2.0 mm. When a specimen of 1.0 g is heated up from 40° C. at a heating rate of 6° C./min, the temperature at which the plunger starts descending is assumed to be the flow start temperature under heat (° C.). Here, three measurements are made for a specimen, and their average is taken as its flow start temperature under heat.

With respect to the melt viscosity of thermoplastic resin to be used for the present invention, the melt viscosity of thermoplastic resin can be adopted favorably if it is in the range of the melt viscosity ratio ηb/ηa where ηa and ηb represent the melt viscosity of polymethylpentene based resin and the melt viscosity of thermoplastic resin, respectively, as described later. For the present invention, thermoplastic resin having a molecular weight and polymerization degree that suit the melt viscosity of the thermoplastic resin can be selected appropriately.

There are no specific limitations on the specific gravity of the thermoplastic resin used for the present invention, but it is preferable to select an appropriate content ratio to polymethylpentene based resin so that the specific gravities of the resulting polymethylpentene conjugate fiber and porous polymethylpentene fiber are in the preferable range described later because in that case, it is possible to obtain polymethylpentene conjugate fiber and porous polymethylpentene fiber having a light weight corresponding to the specific gravity of the thermoplastic resin.

Thermoplastic resin used for the present invention may be one that has been modified through various methods by adding minor additives. Specific examples of such minor additives include, but not limited to, compatibilizer, plasticizer, ultraviolet absorber, infrared ray absorbent, fluorescent brightening agent, mold releasing agent, antibacterial agent, nuclear formation agent, thermal stabilizer, antioxidant, antistatic agent, color protection agent, adjustor, delustering agent, antifoam agent, antiseptic agent, gelatinizer, latex, filler, ink, coloring agent, dye, pigments, and perfume. These minor additives may be used singly, or a plurality thereof may be used in combination.

For the present invention, a compatibilizer may be used as needed for the purpose of improving the dispersibility of the island component in the sea component, controlling the dispersion state, and improving the interfacial adhesion between the sea component and island component. When a sea-island structure is produced by melt spinning, bulges called ballas tend to be formed immediately below the nozzle to make the thinning deformation of the fiber unstable and accordingly, a compatibilizer may be used with the aim of improving the spinning operability through, for example, prevention of thread breakage caused by the ballas.

For the present invention, a compatibilizer may be added to either the sea component or the island component or to both the sea component and the island component. A compatibilizer may be selected appropriately to suit the type of the thermoplastic resin used, copolymerization component, copolymerization ratio, and content ratio between sea component and island component. Different compatibilizers may be used singly, or a plurality thereof may be used in combination.

A compatibilizer to be used for the present invention may be a compound having a molecular structure that contains both a hydrophobic component with high affinity with polymethylpentene based resin, which is highly hydrophobic, and a component with high affinity with the thermoplastic resin of the island component. Alternatively, a compound having a molecular structure that contains both a hydrophobic component with high affinity with polymethylpentene based resin and a functional group reactive with the thermoplastic resin of the island component may also be used.

Specific examples of the hydrophobic component contained in a compatibilizer include, but not limited to, polyethylene, polypropylene, polymethylpentene, polystyrene, ethylene-propylene copolymer, ethylene-butylene copolymer, propylene-butylene copolymer, and styrene-ethylene-butylene-styrene copolymer.

Specific examples of such a component with high affinity with thermoplastic resin or such a functional group reactive with thermoplastic resin include, but not limited to, carboxylic acid group, carboxylic anhydride group, carboxylate group, carboxylic acid ester group, carboxylic acid amide group, amino group, imino group, alkoxy silyl group, silanol group, silyl ether group, hydroxyl group, and epoxy group.

Specific examples of such a compatibilizer include, but not limited to, maleic acid modified polyethylene, maleic anhydride modified polypropylene, maleic anhydride modified polymethylpentene, epoxy modified polystyrene, maleic anhydride modified styrene-ethylene-butylene-styrene copolymer, amino modified styrene-ethylene-butylene-styrene copolymer, imino modified styrene-ethylene-butylene-styrene copolymer.

For the present invention, the compatibilizer to be added preferably accounts for 0.1 to 15 wt % relative to the total quantity of polymethylpentene based resin and thermoplastic resin which accounts for 100 wt %. A compatibilizer content of 0.1 wt % or more is preferable because in that case, this has the effect of increasing the compatibility between the sea component and the island component, leading to an improvement in spinning operability through, for example, prevention of thread breakage. This is preferable also because the increase in spinning operability causes a decrease in the dispersion diameter of island domains, leading to the development of deep, vivid colors when the resulting polymethylpentene conjugate fiber is dyed. Furthermore, this is preferable because dissolving out the island component causes a decrease in the pore diameter, leading to porous polymethylpentene fiber that is resistant to pore deformation and collapse. On the other hand, a compatibilizer content of 15 wt % or less is preferable because this serves to prevent the spinning operability from being destabilized by excessive compatibilizer. This is preferable also because the resulting polymethylpentene conjugate fiber can maintain the good fiber characteristics, appearance, and texture that originate from the polymethylpentene based resin and thermoplastic resin. The compatibilizer content is more preferably 0.5 to 12 wt % and still more preferably 1 to 10 wt %.

Described below is the polymethylpentene conjugate fiber according to the present invention. The polymethylpentene conjugate fiber according to the present invention preferably has a specific gravity of 0.83 to 1.1. If fiber is produced from the polymethylpentene based resin, which has a specific gravity of 0.83, alone, the resulting fiber has the disadvantage of being unable to be dyed though being very light in weight. The present invention is designed to combine polymethylpentene based resin with a low specific gravity and dyeable thermoplastic resin to produce a conjugate fiber so as to impart colors to the lightweight polymethylpentene based resin. The specific gravity of the polymethylpentene conjugate fiber changes depending on the specific gravity and content of the thermoplastic resin to be combined. The specific gravity of the polymethylpentene conjugate fiber should be as low as possible from the viewpoint of lightness, and it is preferably 1.1 or less. If the specific gravity of the polymethylpentene conjugate fiber is 1.1 or less, it is preferable because the lightness of the polymethylpentene based resin and the color developing property of the thermoplastic resin can be maintained simultaneously. The specific gravity of the polymethylpentene conjugate fiber is more preferably 0.83 to 1.05 and still more preferably 0.83 to 1.0.

For both unstretched and stretched yarns, there are no specific limitations on the total fineness of the polymethylpentene conjugate fiber according to the present invention, but it is preferably 10 to 500 dtex. If the polymethylpentene conjugate fiber has a total fineness of 10 dtex or more, it is preferable because the spinning operability and process-passing capability in high-order processing steps will be high and the fiber will not suffer significant fuzzing during use, leading to high durability. On the other hand, if the polymethylpentene conjugate fiber has a total fineness of 500 dtex or less, it is preferable because the fiber and fiber structures will not suffer a decrease in flexibility. The total fineness of the polymethylpentene conjugate fiber is more preferably 30 to 400 dtex and still more preferably 50 to 300 dtex.

For both unstretched and stretched yarns, there are no specific limitations on the strength of the polymethylpentene conjugate fiber according to the present invention, but it is preferably 0.5 to 5.0 cN/dtex. The strength of the polymethylpentene conjugate fiber should be as high as possible from the viewpoint of mechanical characteristics, and it is preferably 0.5 cN/dtex or more. If the polymethylpentene conjugate fiber has a strength of 0.5 cN/dtex or more, it is preferable because it ensures a high spinning operability and high process-passing capability in high-order processing steps and also because fiber and fiber structures with high durability can be obtained. The strength of the polymethylpentene conjugate fiber is more preferably 0.7 to 5.0 cN/dtex and still more preferably 1.0 to 5.0 cN/dtex.

For both unstretched and stretched yarns, there are no specific limitations on the elongation percentage of the polymethylpentene conjugate fiber according to the present invention, but it is preferably 5 to 300%. If the polymethylpentene conjugate fiber has an elongation percentage of 5% or more, it is preferable because it allows the production of fiber and fiber structures having high wear resistant, leading to depression of fuzzing. On the other hand, if the unstretched yarns in the polymethylpentene conjugate fiber have an elongation percentage of 300% or less, it is preferable because it ensures a high handleability during the stretching and mechanical characteristics can be improved by the stretching. Furthermore, if the stretched yarns in the polymethylpentene conjugate fiber have an elongation percentage of 30% or less, it is preferable because it allows the production of fiber and fiber structures with high dimensional stability. If the polymethylpentene conjugate fiber is formed of unstretched yarns, its elongation percentage is preferably 8 to 280% and more preferably 10 to 250%. If the polymethylpentene conjugate fiber is formed of stretched yarns, its elongation percentage is more preferably 8 to 28% and still more preferably 10 to 25%.

For both unstretched and stretched yarns, there are no specific limitations on the initial tensile resistance of the polymethylpentene conjugate fiber according to the present invention, but its initial tensile resistance as measured according to 8.10 of JIS L 1013 (1999) is preferably 10 to 100 cN/dtex. If the polymethylpentene conjugate fiber has an initial tensile resistance of 10 cN/dtex or more, it is preferable because it ensures a high handleability and process-passing capability in high-order processing steps. On the other hand, if the polymethylpentene conjugate fiber has an initial tensile resistance of 100 cN/dtex or less, it is preferable because the fiber and fiber structures will not suffer a decrease in flexibility. The initial tensile resistance of the polymethylpentene conjugate fiber is more preferably 15 to 80 cN/dtex and still more preferably 20 to 60 cN/dtex.

For both unstretched and stretched yarns, there are no specific limitations on the average fiber diameter of the polymethylpentene conjugate fiber according to the present invention, but it is preferably 3 to 100 μm. If the polymethylpentene conjugate fiber has an average fiber diameter of 3 μm or more, it is preferable because it ensures a high spinning operability and a high process-passing capability in high-order processing, allowing the formation of polymethylpentene conjugate fiber with good mechanical characteristics. On the other hand, if the polymethylpentene conjugate fiber has an average fiber diameter of 100 μm or less, it is preferable because the fiber and fiber structures will not suffer a decrease in flexibility. The average fiber diameter of the polymethylpentene conjugate fiber is more preferably 5 to 70 μm and still more preferably 7 to 50 μm.

In the polymethylpentene conjugate fiber according to the present invention, the dispersion diameter of the island domains in the fiber cross section is preferably 0.001 to 2 μm. The dispersion diameter of the island domains in the fiber cross section should be as small as possible from the viewpoint of color developing property, but it is preferably 2 μm or less. If the dispersion diameter of the island domains in the fiber cross section of the polymethylpentene conjugate fiber is 2 μm or less, it is preferable because it ensures stable discharge from the spinning nozzle during melt spinning, leading to high spinning operability. Furthermore, it is preferable also because good color developing property is achieved by the thermoplastic resin of the island component dispersed in the polymethylpentene based resin of the sea component. The dispersion diameter of the island domains in the fiber cross section of the polymethylpentene conjugate fiber is more preferably 0.001 to 1.5 μm and still more preferably 0.001 to 1.0 μm.

In the polymethylpentene conjugate fiber according to the present invention, the coefficient of variation CV of the dispersion diameter of the island domains in the fiber cross section is preferably 1 to 50%. The method to be used for measuring the coefficient of variation CV will be described in detail later, but the coefficient of variation CV is an indicator of uniformity and is calculated by dividing the standard deviation by the average. In the polymethylpentene conjugate fiber according to the present invention, the coefficient of variation CV of the dispersion diameter of the island domains in the fiber cross section should be as small as possible from the viewpoint of color developing property, but technically its lower limit is 1%. If the coefficient of variation CV of the dispersion diameter of the island domains in the fiber cross section is 50% or less, it is preferable because good color developing property is achieved by the thermoplastic resin of the island component dispersed in the polymethylpentene based resin of the sea component. The coefficient of variation CV of the dispersion diameter of the island domains in the fiber cross section is more preferably 1 to 45%, still more preferably 1 to 40%, particularly preferably 1 to 30%, and extremely preferably 1 to 20%.

For the polymethylpentene conjugate fiber according to the present invention, there are no specific limitations on the shape of the fiber cross section, and the cross section may be either perfect circular or non-circular. Specific examples of such non-circular shapes include, but not limited to, multilobar, polygonal, flattened, elliptic, C-shaped, H-shaped, S-shaped, T-shaped, W-shaped, X-shaped, Y-shaped, grid-like, double-crossed, and hollow.

For the polymethylpentene conjugate fiber according to the present invention, there are no specific limitations on the shape of the island domains in the fiber cross section, and the section may be either perfect circular or non-circular. Specific examples of such non-circular section shapes include, but not limited to, multilobar, polygonal, flattened, T-shaped, X-shaped, and Y-shaped.

Described below is the porous polymethylpentene fiber according to the present invention.

The porous polymethylpentene fiber according to the present invention may contain thermoplastic resin. The porous polymethylpentene fiber according to the present invention can be produced by preparing a conjugate fiber having a sea-island structure composed of polymethylpentene based resin as sea component and thermoplastic resin as island component and dissolving out the island component to form pores. If pores are formed while leaving part of the island component, the thermoplastic resin will be left along the pore peripheries. Since polymethylpentene based resin is high in transparency and low in refractive index, vivid colors can be developed in the inner parts of the fiber by dyeing the thermoplastic resin left along the peripheries of pores in inner parts of the fiber, indicating that color development property can be imparted to the porous polymethylpentene fiber.

In the porous polymethylpentene fiber according to the present invention, the coefficient of variation CV of the pore diameter in the fiber cross section is 1 to 50%. The method to be used for measuring the coefficient of variation CV will be described in detail later, but the coefficient of variation CV is an indicator of uniformity and is calculated by dividing the standard deviation by the average. In the porous polymethylpentene fiber according to the present invention, the coefficient of variation CV of the pore diameter in the fiber cross section should be as small as possible from the viewpoint of durability, but technically its lower limit is 1%. If the coefficient of variation CV of the pore diameter in the fiber cross section is 50% or less, it is preferable because it ensures a high uniformity in pore size and depression of pore deformation and collapse due to stress concentrations, allowing the production of porous polymethylpentene fiber with a high pore resistance to external force. Furthermore, if the porous polymethylpentene fiber contains thermoplastic resin and has high uniformity in pore size, it is preferable because uniform color development can be achieved by dyeing the thermoplastic resin. The coefficient of variation CV of the pore diameter in the fiber cross section is more preferably 1 to 45%, still more preferably 1 to 40%, particularly preferably 1 to 30%, and extremely preferably 1 to 20%.

In the porous polymethylpentene fiber according to the present invention, the average diameter of the pores in the fiber cross section is preferably 0.001 to 2 μm. If the average diameter of the pores in the fiber cross section is 0.001 μm or more, it is preferable because the pores can serve for weight reduction, heat insulation, and cushioning. Furthermore, if the porous polymethylpentene fiber contains thermoplastic resin and the thermoplastic resin is finely dispersed in the inner parts of the fiber, it is preferable because dyeing of the thermoplastic resin allows the transmitted beams and reflected beams from inside the fiber to be mixed randomly to give vivid colors. On the other hand, if the average diameter of the pores in the fiber cross section is 2 μm or less, it is preferable because pore deformation and collapse are depressed, leading to a high pore resistance to external force and high durability. The average diameter of the pores in the fiber cross section of the porous polymethylpentene fiber is more preferably 0.005 to 1.5 μm and still more preferably 0.01 to 1.0 μm.

The porous polymethylpentene fiber according to the present invention preferably has a porosity of 0.1 to 70%. A porosity of 0.1% or more is preferable because the polymethylpentene based resin, which is originally low in specific gravity, not only can be made still lighter but also can be imparted with heat insulation property and cushioning property. On the other hand, a porosity of 70% or less is preferable because the fiber and fiber structures can maintain both mechanical strength and other good properties such as lightweight, heat insulation, and cushioning. The porosity of the porous polymethylpentene fiber is more preferably 0.5 to 60%, still more preferably 1 to 50%, particularly preferably 5 to 30%, and extremely preferably 10 to 20%.

The porous polymethylpentene fiber according to the present invention preferably has a specific gravity of 0.25 to 0.80. Even when fiber is produced from the polymethylpentene based resin, which has a specific gravity of 0.83, alone, the resulting fiber is fairly light in weight. For the present invention, pores are formed in fiber to make the fiber porous. Accordingly, polymethylpentene fiber with a low specific gravity can be made still lighter and the pores serve to impart heat insulation property, cushioning property, etc. The specific gravity of the porous polymethylpentene fiber changes depending on the porosity of the fiber. On the other hand, if the specific gravity of the porous polymethylpentene fiber is 0.25 or more, it is preferable because the fiber and fiber structures can maintain both mechanical strength and other good properties such as lightweight, heat insulation, and cushioning. On the other hand, if the specific gravity of the porous polymethylpentene fiber is 0.80 or less, it is preferable because the polymethylpentene based resin, which is originally low in specific gravity, not only can be made still lighter but also can be imparted with heat insulation property and cushioning property. The specific gravity of the porous polymethylpentene fiber is more preferably 0.33 to 0.75 and still more preferably 0.42 to 0.70.

There are no specific limitations on the total fineness of the porous polymethylpentene fiber according to the present invention, which therefore may be adjusted appropriately to suite particular uses and required characteristics, but it is preferably 10 to 500 dtex. If the porous polymethylpentene fiber has a total fineness of 10 dtex or more, it is preferable because it ensures low thread breakage frequency and high process-passing capability and the fiber will not suffer significant fuzzing during use, leading to high durability. On the other hand, if the porous polymethylpentene fiber has a total fineness of 500 dtex or less, it is preferable because the fiber and fiber structures will not suffer a decrease in flexibility. The total fineness of the porous polymethylpentene fiber is more preferably 30 to 400 dtex and still more preferably 50 to 300 dtex.

There are no specific limitations on the strength of the porous polymethylpentene fiber according to the present invention, which therefore may be adjusted appropriately to suite particular uses and required characteristics, but it is preferably 0.5 to 5.0 cN/dtex. The strength of the porous polymethylpentene fiber should be as high as possible from the viewpoint of mechanical characteristics, and it is preferably 0.5 cN/dtex or more. If the porous polymethylpentene fiber has a strength of 0.5 cN/dtex or more, it is preferable because it ensures low thread breakage frequency, high process-passing capability, and high durability. The strength of the porous polymethylpentene fiber is more preferably 0.7 to 5.0 cN/dtex and still more preferably 1.0 to 5.0 cN/dtex.

There are no specific limitations on the elongation percentage of the porous polymethylpentene fiber according to the present invention, which therefore may be adjusted appropriately to suite particular uses and required characteristics, but it is preferably 5 to 300%. If the porous polymethylpentene fiber has an elongation percentage of 5% or more, it is preferable because it allows the production of fiber and fiber structures having high wear resistant, leading to depression of fuzzing and high durability. On the other hand, if the porous polymethylpentene fiber has an elongation percentage of 300% or less, it is preferable because it allows the production of fiber and fiber structures with high dimensional stability. If stretching is performed during the production of porous polymethylpentene fiber, the elongation percentage is more preferably 8 to 28% and still more preferably 10 to 25%.

There are no specific limitations on the initial tensile resistance of the porous polymethylpentene fiber according to the present invention, which therefore may be adjusted appropriately to suite particular uses and required characteristics, but the initial tensile resistance as measured according to 8.10 of JIS L 1013 (1999) is preferably 10 to 100 cN/dtex. If the porous polymethylpentene fiber has an initial tensile resistance of 10 cN/dtex or more, it is preferable because it ensures a high process-passing capability and high handleability as well as good mechanical characteristics. On the other hand, if the porous polymethylpentene fiber has an initial tensile resistance of 100 cN/dtex or less, it is preferable because the fiber and fiber structures produced therefrom will not suffer a decrease in flexibility. The initial tensile resistance of the porous polymethylpentene fiber is more preferably 15 to 80 cN/dtex and still more preferably 20 to 60 cN/dtex.

There are no specific limitations on the average fiber diameter of the porous polymethylpentene fiber according to the present invention, which therefore may be adjusted appropriately to suite particular uses and required characteristics, but the average fiber diameter is preferably 3 to 100 µm. If the porous polymethylpentene fiber has an average fiber diameter of 3 µm or more, it is preferable because it ensures a high process-passing capability and high handleability as well as excellent durability. On the other hand, if the porous polymethylpentene fiber has an average fiber diameter of 100 µm or less, it is preferable because the fiber and fiber structures will not suffer a decrease in flexibility. The average fiber diameter of the porous polymethylpentene fiber is more preferably 5 to 70 µm and still more preferably 7 to 50 µm.

For the porous polymethylpentene fiber according to the present invention, there are no specific limitations on the shape of the fiber cross section, and the cross section may be either perfect circular or non-circular. Specific examples of non-circular shapes include, but not limited to, multilobar, polygonal, flattened, elliptic, C-shaped, H-shaped, S-shaped, T-shaped, W-shaped, X-shaped, and Y-shaped.

For the porous polymethylpentene fiber according to the present invention, there are no specific limitations on the shape of the pores in the fiber cross section, and the section may be either perfect circular or non-circular. Specific examples of such non-circular section shapes include, but not limited to, multilobar, polygonal, flattened, elliptic, T-shaped, X-shaped, and Y-shaped.

The polymethylpentene conjugate fiber and porous polymethylpentene fiber according to the present invention may be ones that have been modified through various methods by adding minor additives. Specific examples of such minor additives include, but not limited to, compatibilizer, plasticizer, ultraviolet absorber, infrared ray absorbent, fluorescent brightening agent, mold releasing agent, antibacterial agent, nuclear formation agent, thermal stabilizer, antioxidant, antistatic agent, color protection agent, adjustor, delustering agent, antifoam agent, antiseptic agent, gelatinizer, latex, filler, ink, coloring agent, dye, pigments, and perfume. These minor additives may be used singly, or a plurality thereof may be used in combination.

There are no specific limitations on the form of the polymethylpentene conjugate fiber and porous polymethylpentene fiber according to the present invention, which therefore, may be in the form of monofilament, multifilament, or staple.

As in the case of other general fibers, the polymethylpentene conjugate fiber and porous polymethylpentene fiber according to the present invention may be processed by, for example, stretching, false-twisting, and twining, and may also be woven and knitted by methods generally used for fiber.

There are no specific limitations on the form of the fiber structures to be produced from the polymethylpentene conjugate fiber and porous polymethylpentene fiber according to the present invention, which therefore, may be processed by generally known methods into, for example, woven fabric, knitted fabric, pile fabric, nonwoven fabric, spun yarn, and wadding. Fiber structures to be produced from the polymethylpentene conjugate fiber and porous polymethylpentene fiber according to the present invention may be of any weave or knit structure and may preferably be processed by plain weaving, diagonal weaving, sateen weaving, or their modified weaving techniques, or warp knitting, weft knitting, circular knitting, lace stitching, or their modified knitting techniques.

The polymethylpentene conjugate fiber and porous polymethylpentene fiber according to the present invention may be produced by combining polymethylpentene conjugate fiber or porous polymethylpentene fiber with other fibers by mixed weaving or mixed knitting to form fiber structures or preparing combined filament yarns from polymethylpentene conjugate fiber or porous polymethylpentene fiber along with other fibers, followed by processing them into fiber structures.

Described below are production methods for the polymethylpentene conjugate fiber and porous polymethylpentene fiber according to the present invention.

The polymethylpentene conjugate fiber according to the present invention has a sea-island structure including polymethylpentene based resin as sea component and thermoplastic resin as island component. On the other hand, the porous polymethylpentene fiber according to the present invention can be produced by dissolving out at least part of the island component from the polymethylpentene conjugate fiber having a sea-island structure including polymethylpentene based resin as sea component and thermoplastic resin as island component. Forming pores by completely dissolving out the island component is preferable because highly lightweight porous polymethylpentene fiber formed only of the polymethylpentene based resin can be obtained. On the other hand, if part of the island component is left, instead of dissolving out the island component completely, in forming pores, porous polymethylpentene fiber composed of both polymethylpentene based resin and thermoplastic resin is obtained. This is preferable not only because of the lightness, but also because colors can be imparted to the porous polymethylpentene fiber by dyeing the thermoplastic resin.

For the present invention, useful methods for forming such a sea-island structure include, but not limited to, sea-island conjugate spinning, which is a kind of melt spinning, and polymer alloy type spinning. In general, when sea-island conjugate spinning is performed, the subsequent dissolving-out of the island component does not produce through-holes extending from the interior to the exterior (lateral face) of the porous polymethylpentene fiber whereas when polymer alloy type spinning is performed, the subsequent dissolving-out of the island component produces through-holes extending from the interior to the exterior (lateral face) of the porous polymethylpentene fiber, with the features of the through-holes depending on the content ratio and melt viscosity ratio between the sea component and the island component.

For the polymethylpentene conjugate fiber according to the present invention, the content ratio (by weight) between the sea component and the island component is preferably 20/80 to 99/1. If the sea component has a content of 20 wt % or more, it is preferable because abnormalities such as joining of island domains does not occur during conjugate formation by melt spinning, leading to stable discharge from the spinning nozzle. Furthermore, since thermoplastic resin with good color developing property is scattered in polymethylpentene based resin with a low refractive index, it is preferable because deep, vivid colors can be developed and also because lightness, which is an advantageous feature of the polymethylpentene based resin, can be imparted to the thermoplastic resin. On the other hand, if the sea component accounts for 99 wt % or less, that is, the island component accounts for 1 wt % or more, it is preferable because dyeing of many island domains scattered in the sea domain allows the transmitted beams through island domains and the reflected beams from island domains to be mixed randomly to give deep, vivid colors. The content ratio (by weight) between the sea component and the island component is more preferably 30/70 to 95/5 and still more preferably 40/60 to 90/10.

For the polymethylpentene conjugate fiber to be used to produce the porous polymethylpentene fiber according to the present invention, the content ratio (by weight) between the sea component and the island component is preferably 30/70 to 99.9/0.1. If the sea component has a content of 30 wt % or more, it is preferable because abnormalities such as joining of island domains does not occur during conjugate formation by melt spinning, leading to stable discharge from the spinning nozzle. Furthermore, it is preferable also because the fiber and fiber structures can maintain both mechanical strength and other good properties such as lightweight, heat insulation, and cushioning. On the other hand, if the sea component accounts for 99.9 wt % or less, that is, the island component accounts for 0.1 wt % or more, it is preferable because the fiber can be made porous by dissolving out the island component to allow the polymethylpentene based resin with a low specific gravity to be made still lighter and in addition, heat insulation property, cushioning property, etc., can be imparted. The content ratio (by weight) between the sea component and the island component is more preferably 40/60 to 99/1 and still more preferably 50/50 to 95/5.

For the polymethylpentene conjugate fiber according to the present invention, the number of island domains in a fiber cross section is preferably 8 to 200 when sea-island conjugate spinning is to be performed. If the number of island domains is 8 or more, it is preferable because the transmitted beams through island domains and the reflected beams from island domains are mixed randomly to give deep, vivid colors, unlike core-sheath type conjugate fibers and sea-island type conjugate fibers in which the number of island domains is less than 8. On the other hand, if the number of island domains is 200 or less, it is preferable because the use of a spinning nozzle of a complicated structure is not necessary, serving to depress the deterioration in spinning operability or mechanical characteristics due to abnormalities such as joining of island domains during conjugate formation. The number of island domains in a fiber cross section is more preferably 16 to 180 and still more preferably 32 to 160 when sea-island conjugate spinning is to be performed. When polymer alloy type spinning is to be performed, there are no specific limitations on the number of island domains in a fiber cross section and from the viewpoint of color developing property, it is preferably as large as possible, particularly 8 or more. If the number of island domains is 8 or more, it is preferable because the transmitted beams through island domains and the reflected beams from island domains are mixed randomly to give deep, vivid colors. The number of island domains in a fiber cross section is more preferably 16 or more and still more preferably 32 or more when polymer alloy type spinning is to be performed.

For the polymethylpentene conjugate fiber to be used to produce the porous polymethylpentene fiber according to the present invention, the number of island domains in a fiber cross section should be at least such as to allow the porous polymethylpentene fiber according to the present invention to be formed. The number of island domains in a fiber cross section is preferably 8 to 200 when sea-island conjugate spinning is to be performed. If the number of island domains is 8 or more, that is, the number of pores is 8 or more, it is preferable because external forces, if applied to the fiber, will be dispersed and pore deformation and collapse due to stress concentrations will be depressed, allowing porous polymethylpentene fiber with a high rate of pore retention to be produced, unlike the case of porous fiber with less than 8 pores. Furthermore, if the porous polymethylpentene fiber contains thermoplastic resin, it is preferable because dyeing of the thermoplastic resin existing in the fiber allows the transmitted beams and reflected beams from inside the fiber to be mixed randomly to give vivid colors. On the other hand, if the number of island domains is 200 or less, it is preferable because the use of a spinning nozzle of a complicated structure is not necessary and the occurrence of abnormalities such as joining of island domains is depressed during conjugate formation, leading to a high uniformity in the dispersion diameter of the island domains, a high pore size uniformity in the porous polymethylpentene fiber resulting from the dissolving-out of the island component, and depression of pore deformation and collapse. Furthermore, if the porous polymethylpentene fiber contains thermoplastic resin and has high uniformity in pore size, it is preferable because uniform color development can be achieved by dyeing the thermoplastic resin. The number of island domains in a fiber cross section is more preferably 16 to 180 and still more preferably 32 to 160 when sea-island conjugate spinning is to be performed. When polymer alloy type spinning is to be performed, there are no specific limitations on the number of island domains in a fiber cross section and from the viewpoint of lightness, heat insulation, and cushioning of the porous polymethylpentene fiber resulting from the dissolving-out of the island component, it is preferably as large as possible, particularly 8 or more. If the number of island domains is 8 or more, that is, the number of pores is 8 or more, it is preferable because external forces, if applied to the fiber, will be dispersed and pore deformation and collapse due to stress concentrations will be depressed, allowing porous polymethylpentene fiber with a high rate of pore retention to be produced, unlike the case of porous fiber with less than 8 pores. Furthermore, if the porous polymethylpentene fiber contains thermoplastic resin, it is preferable because dyeing of the thermoplastic resin existing in the fiber allows the transmitted beams and reflected beams from inside the fiber to be mixed randomly to give deep, vivid colors. The number of island domains in a fiber cross section is more preferably 16 or more and still more preferably 32 or more when polymer alloy type spinning is to be performed.

For the present invention, the melt viscosity ratio ($\eta b/\eta a$) between the melt viscosity ($\eta a$) polymethylpentene based resin of the sea component and the melt viscosity ($\eta b$) of the thermoplastic resin of the island component is preferably 0.1 to 4.0. As described later in detail below in relation to the measure method for melt viscosity $\eta$, the melt viscosity ratio is defined as the ratio between the melt viscosity of the polymethylpentene based resin and that of the thermoplastic resin determined from measurements taken at the spinning temperature and a shear velocity of 1216 $sec^{-1}$. Here, the spinning temperature means the temperature at which the spinning pack is heated in the spinning block of the melt spinning machine. When conjugate fiber is produced by melt spinning, by polymer alloy type spinning in particular, the state of dispersion of the island component in the sea component changes depending on the melt viscosity ratio between the sea component and the island component and therefore, the melt viscosity ratio between the sea component and the island component plays an important role in controlling the dispersion diameter of the island domains in the fiber cross section and the pore diameter in the fiber cross section after dissolving out the island component. Accordingly, the coefficient of variation CV of the dispersion diameter of the island domains in the fiber cross section and the coefficient of variation CV of the pore diameter change depending on the melt viscosity ratio between the sea component and the island component. A melt viscosity ratio ($\eta b/\eta a$) of 0.1 or more is preferable because abnormalities such as joining of island domains do not occur during conjugate formation by melt spinning and an increase in the dispersion diameter of the island domains in the fiber cross section is prevented, leading to a sea-island structure with a good dispersion state. It is preferable also because it ensures a high uniformity in the pore diameter in the fiber cross section after dissolving out the island component. Furthermore, if the porous polymethylpentene fiber contains thermoplastic resin and has high uniformity in pore size, it is preferable because uniform color development can be achieved by dyeing the thermoplastic resin. On the other hand, a melt viscosity ratio ($\eta b/\eta a$) of 4.0 or less is preferable because it ensures stable discharge from the spinning nozzle during melt spinning, leading to high spinning operability. It is preferable also because the high uniformity in the dispersion diameter of the island domains in the fiber cross section ensures good level dyeing without dyeing specks caused during dyeing and also ensures high uniformity in the pore diameter in the fiber cross section after dissolving out the island component. Furthermore, if the porous polymethylpentene fiber contains thermoplastic resin and has high uniformity in pore size, it is preferable because uniform color development can be achieved by dyeing the thermoplastic resin. The melt viscosity ratio ($\eta b/\eta a$) is more preferably 0.3 to 3.0 and still more preferably 0.5 to 2.0.

For the present invention, it is preferable that the polymethylpentene based resin and thermoplastic resin are dried to a water content of 0.3 wt % or less before starting the melt spinning. A water content of 0.3 wt % or less is preferable because foam formation is prevented from being caused by water during the melt spinning, allowing the spinning to be performed stably. The water content is more preferably 0.2 wt % or less and still more preferably 0.1 wt % or less.

The melt spinning can be carried out by a generally known method such as, but not limited to, those described below. For the present invention, sea-island conjugate spinning or polymer alloy type spinning can be adopted favorably to form a sea-island structure.

When sea-island conjugate spinning is to be performed, chips are dried as required and then the chips are supplied to an extruder type or a pressure melter type melt spinning machine, where the sea component and the island component are melted separately and weighed by measuring pumps. Subsequently, the melt is introduced into the spinning pack heated in the spinning block and the molten polymer is filtered in the spinning pack, followed by combining the sea component and the island component to form a sea-island structure in a sea-island conjugate formation spinning nozzle and discharging the melt through the spinning nozzle to provide a fiber thread. This method can be adopted favorably.

When polymer alloy type spinning is to be performed, useful methods for discharging the melt through a spinning nozzle to provide a fiber thread include, but not limited to, those described below. In a first example, the sea component and the island component are melt-kneaded in an extruder etc. to prepare composite material and chips thereof are dried as required, followed by supplying the chips to a melt spinning machine, where they are melted, and weighing the melt by a measuring pump. Subsequently, it is introduced into the spinning pack heated in the spinning block and the molten polymer is filtered in the spinning pack, followed by discharging it through the spinning nozzle to provide a fiber thread. In a second example, chips are dried as required and the chips of the sea component and those of the island component are mixed together, followed by supplying the mixed chips to a melt spinning machine, where they are melted, and weighing by a measuring pump. Subsequently, it is introduced into the spinning pack heated in the spinning block and the molten polymer is filtered in the spinning pack, followed by discharging it through the spinning nozzle to provide a fiber thread.

In either the sea-island conjugate spinning process or the polymer alloy type spinning process, the fiber thread discharged from the spinning nozzle is cooled and solidified in a cooling apparatus, taken up by a first godet roller, and wound up by a winder via a second godet roller to provide a wound yarn. Here, a heating cylinder or heat insulation cylinder with a length of 2 to 20 cm may be installed below the spinning nozzle as required to improve the spinning operability, productivity, and mechanical characteristics of the fiber. In addition, an oil feeding apparatus may be used to supply oil to the fiber thread or an entangling machine may be used to entangle the fiber thread.

The spinning temperature used for the melt spinning may be set appropriately to suit the melting point and heat resistance of the polymethylpentene based resin and thermoplastic resin, but it is preferably in the range of 220 to 320° C. A spinning temperature of 220° C. or more is preferable because the elongation viscosity of the fiber thread discharged through the spinning nozzle is maintained sufficiently low to ensure stable discharge and also because the spinning tension is prevented from increasing excessively to depress thread breakage. On the other hand, a spinning temperature of 320° C. or less is preferable because heat decomposition during spinning is depressed and the resulting polymethylpentene conjugate fiber and porous polymethylpentene fiber do not suffer deterioration in mechanical characteristics or coloring. The spinning temperature is more preferably 240 to 300° C. and still more preferably 260 to 280° C.

The spinning speed during the melt spinning may be set appropriately to suit the type, content ratio, and spinning temperature of the thermoplastic resin, but it is preferably 10 to 5,000 m/min. A spinning speed of 10 m/min or more is preferable because the traveling of the thread is maintained stable and thread breakage is depressed. On the other hand, a spinning speed of 5,000 m/min or less is preferable because the fiber thread can be cooled sufficiently to ensure stable spinning. The spinning speed is more preferably 300 to 4,000 m/min and still more preferably 500 to 3,000 m/min.

The fiber taken up after the melt spinning may be stretched to obtain polymethylpentene conjugate fiber and porous polymethylpentene fiber that have intended fiber characteristics. When such stretching is carried out, it may be performed by the two step process in which the fiber is taken up first and stretched subsequently or by the direct spinning and stretching process in which the fiber is stretched continuously without being taken up.

When such stretching is carried out, it may be performed by either a single stage stretching process or a multi-stage stretching process in which the fiber is stretched in two or more stages. There are no specific limitations on the heating method used for the stretching as long as the traveling thread can be heated directly or indirectly. Specific examples of heating methods include, but not limited to, the use of a heating roller, heating pin, heating plate, liquid bath such as warm water and hot water, gas bath such as hot air and steam, and laser. These heating methods may be used singly, or a plurality thereof may be used in combination. Favorable heating methods include contact with a heating roller, contact with a heating pin, contact with a heating plate, and immersion in a liquid bath from the viewpoint of control of the heating temperature, uniform heating of the traveling thread, and simplification of equipment.

When stretching is carried out, the draw ratio may be set appropriately to suit the type and content ratio of the thermoplastic resin and the strength and elongation percentage of the stretched polymethylpentene conjugate fiber and porous polymethylpentene fiber, but it is preferably 1.02 to 7.0. A draw ratio of 1.02 or more is preferable because such stretching can improve mechanical characteristics such as strength and elongation percentage of the polymethylpentene conjugate fiber and porous polymethylpentene fiber. On the other hand, a draw ratio of 7.0 or less is preferable because thread breakage during stretching is depressed to ensure stable stretching. The draw ratio is more preferably 1.2 to 6.0 and still more preferably 1.5 to 5.0.

When stretching is carried out, the stretching temperature may be set appropriately to suit the type and content ratio of the thermoplastic resin and the strength and elongation percentage of the stretched polymethylpentene conjugate fiber and porous polymethylpentene fiber, but it is preferably 50 to 150° C. A stretching temperature of 50° C. or more is preferable because the thread supplied to the stretching step is preheated sufficiently and uniform heat deformation is achieved during the stretching step to ensure the depression of uneven fineness distribution. On the other hand, a stretching temperature of 150° C. or less is preferable because the fiber can slip smoothly on the stretching rollers to ensure depression of thread breakage and stable stretching. The stretching temperature is more preferably 60 to 140° C. and still more preferably 70 to 130° C. In addition, heat setting may be performed at 50 to 150° C. as required.

If stretching is to be performed, the stretching speed may be set appropriately to suit the type and content ratio of the thermoplastic resin and the stretching method which may be of the two step type or the direct spinning and stretching type, but it is preferably 30 to 1,000 m/min. A stretching speed of 30 m/min or more is preferable because the traveling of the thread is maintained stable and thread breakage is depressed. On the other hand, a stretching speed of 1,000 m/min or less is preferable because thread breakage during stretching is depressed to ensure stable stretching. The stretching speed is more preferably 50 to 800 m/min and still more preferably 100 to 500 m/min.

There are no specific limitations on the method to be used for the dissolving-out of the island component for the present invention, and the island component may be dissolved out from either unstretched yarns or stretched yarns of polymethylpentene conjugate fiber having a sea-island structure, or the island component may be dissolved out after polymethylpentene conjugate fiber of a sea-island structure is processed into a fiber structure of woven or knitted fabrics, nonwoven fabrics, or spun yarns. Alternatively, the island component may not be dissolved out completely, but part of the island component may be left in the porous polymethylpentene fiber. Leaving part of the thermoplastic resin of the island component is preferable because colors can be imparted to the porous polymethylpentene fiber by dyeing the thermoplastic resin.

For the present invention, a solvent used for dissolving out the island component may be selected appropriately to suit the type, copolymerization component, and copolymerization ratio of the thermoplastic resin. For example, useful ones include, but not limited to, aqueous alkali solutions containing alkali metal compounds such as sodium hydroxide, potassium hydroxide, sodium carbonate, and potassium carbonate when polyester is used as thermoplastic resin; aqueous acid solutions containing formic acid when polyamide is used; hot water when polyvinyl alcohol or polyalkylene glycol is used; organic solvents such as toluene, xylene, and trichloroethylene when polyolefin or polystyrene is used; and water and organic solvents such as acetone and chloroform when cellulose derivatives are used.

The treatment temperature and treatment time for dissolving out the island component may be set appropriately to suit the type of the thermoplastic resin, the content ratio between the sea component and the island component, and the solvent used for dissolving out the island component. Furthermore, the content of the thermoplastic resin left in the porous polymethylpentene fiber can be controlled by adjusting the treatment temperature and treatment time for dissolving out the island component. Here, the content of the remaining thermoplastic resin can be set appropriately to suit the specific gravity, color developing property, content ratio, etc., of the thermoplastic resin, but it is preferably 1 to 20%. If the content of the remaining thermoplastic resin is 1% or more, it is preferable because colors can be imparted to the porous polymethylpentene fiber. If the content of the remaining thermoplastic resin is 20% or less, it is preferable because it can ensure both lightness attributable to the polymethylpentene resin and color developing property of the thermoplastic resin. The content of the remaining thermoplastic resin is more preferably 3 to 17% and still more preferably 5 to 15%.

The concentration of the solvent, such as aqueous alkali solution and aqueous acid solution, used for dissolving out the island component may be set appropriately to suit the type of the thermoplastic resin, copolymerization component thereof, copolymerization ratio thereof, content ratio between the sea component and the island component, and treatment temperature and treatment time for dissolving out the island component. Furthermore, the content of the thermoplastic resin left in the porous polymethylpentene fiber can be controlled by adjusting the concentration of the solvent, such as aqueous alkali solution and aqueous acid solution, used for dissolving out the island component.

For the present invention, an accelerator may be added as required to the solvent used for dissolving out the island component with the aim of promoting the dissolving-out of the island component. An accelerator may be selected appropriately to suit the type of the thermoplastic resin used, copolymerization component thereof, copolymerization ratio thereof, content ratio between the sea component and the island component, and treatment temperature and treatment time for dissolving out the island component. When polyester is used as the thermoplastic resin, for example, specific examples of useful accelerators include, but not limited to, quaternary ammonium salts such as octyl dimethyl ammonium chloride, lauryl trimethyl ammonium chloride, trimethyl benzyl ammonium chloride, lauryl dimethyl benzyl ammonium chloride, stearyl trimethyl ammonium chloride, cetyl trimethyl ammonium chloride, octyl trimethyl ammonium bromide, lauryl dibutyl allyl ammonium bromide, cetyl dimethyl cyclohexyl ammonium bromide, lauryl phenyl trimethyl ammonium methosulfate, stearyl ethyl dihydro oxyethyl ammonium ethosulfate, and lauryl trihydroxyethyl ammonium hydroxide. These accelerators may be used singly, or a plurality thereof may be used in combination.

For the dissolving-out of the island component, a suitable apparatus may be selected appropriately to suit the polymethylpentene conjugate fiber or the fiber structure of polymethylpentene conjugate fiber. Specific examples of apparatuses useful for dissolving out the island component include, but not limited to, those commonly used for dyeing processing such as cheese dyeing machine, jet dyeing machine, drum dyeing machine, beam dyeing machine, wince dyeing machine, jigger dyeing machine, and high pressure jigger dyeing machine, as well as those equipped with a pad designed to feed a solvent for dissolving out the island component prior to atmospheric pressure steam treatment, compression steam treatment, or dry heat treatment.

For the present invention, the dissolving-out of the island component may be followed by treatment such as rinsing, neutralization, and drying that suits the type of the thermoplastic resin and the type of the solvent used for dissolving out the island component.

For the present invention, dyeing may be performed as required for any of the following states: polymethylpentene conjugate fiber, fiber structure formed of polymethylpentene conjugate fiber, porous polymethylpentene fiber, and fiber structure formed of porous polymethylpentene fiber. Alternatively, the thermoplastic resin of the island component may not be dissolved out completely, but part of the thermoplastic resin of the island component may be left in the porous polymethylpentene fiber when it is dyed.

There are no specific limitations on the dyeing method to be used for the present invention, and generally known methods may be performed favorably using a cheese dyeing machine, jet dyeing machine, drum dyeing machine, beam dyeing machine, jigger dyeing machine, high pressure jigger dyeing machine, etc.

For the present invention, a suitable dye selected appropriately to suit the type of the thermoplastic resin. Almost any dye cannot effectively dye the polymethylpentene based resin contained in the polymethylpentene conjugate fiber or porous polymethylpentene fiber, but fiber or fiber structures with good color developing property can be obtained by dyeing the thermoplastic resin. The dyes that can be adopted favorably include, but not limited to, disperse dyes for polyester used as thermoplastic resin; acidic dyes for polyamide; cationic dyes for thermoplastic polyacrylonitrile; acidic dyes for thermoplastic polyurethane; cationic dyes for modified polyolefin; disperse dyes for polyvinyl chloride; and disperse dyes for cellulose derivatives.

For the present invention, there are no specific limitations on the dye concentration and dyeing temperature, and generally known methods can be adopted favorably. In addition, degumming may be performed as required before the dyeing step and reduction cleaning may be performed after the dyeing step.

In the polymethylpentene conjugate fiber and fiber structures formed of the polymethylpentene conjugate fiber that are produced according to the present invention, deep, vivid colors have been imparted to the lightweight polymethylpentene fiber. Accordingly, they can be applied to apparel and other products that require lightness and color developing property, in addition to those uses where conventional polyolefin based fibers have been adopted. Furthermore, the porous polymethylpentene fiber and fiber structures formed of the porous polymethylpentene fiber that are produced according to the present invention not only have excellent lightweight property, but also contain pores with uniformity diameters, leading to a high pore resistance to external force. Accordingly, they can be applied favorably to uses that require lightness, heat insulation, and cushioning properties. Porous polymethylpentene fiber that contains thermoplastic resin can be applied favorably to uses that require color developing property because colors can be imparted thereto. The uses where conventional polyolefin based fibers have been adopted include, but not limited to, interior uses such as tile carpets, household carpets, automobile mats and general material uses such as ropes, protective nets, filter fabrics, narrow tapes, braids, and chair upholstery. In addition, there will be new uses to be developed by the present invention, including, but not limited to, general clothing such as women's wear, men's wear, lining, underwear, down jackets, vests, inner garments, and outer garments; sports clothing such as wind breakers, outdoor sports wear, skiing wear, golf wear, and swimsuits; bedding such as mattress wadding, outer fabrics of mattress, mattress covers, blankets, outer fabrics of blankets, blanket covers, pillow wadding, pillow covers, and sheets; interior materials such as tablecloth and curtains; and other materials such as belts, bags, sewing threads, sleeping bags, and tents.

EXAMPLES

The invention is described in more detail below with reference to Examples. The characteristic values given in Examples were determined by the following methods.

A. Melting Point

In regard to the polymethylpentene based resin and thermoplastic resin, the melting point was measured using a model DSC7 differential scanning calorimeter (DSC) manufactured by Perkin-Elmer. A specimen of about 10 mg was heated from 30° C. to 280° C. in a nitrogen atmosphere at a heating rate of 15° C./min and maintained at 280° C. for 3 minutes to remove heat history from the specimen. Then, it was cooled from 280° C. to 30° C. at a cooling rate of 15° C./min and maintained at 30° C. for 3 minutes. It was heated again from 30° C. to 280° C. at a heating rate 15° C./min, and the peak temperature of the endothermic peak observed during the second heating process was assumed to be its melting point (° C.). Here, three measurements were made for a specimen, and their average was taken as the melting point.

B. Sea-Island/Compatibilizer Content Ratio

The sea-island/compatibilizer content ratio (by weight) was calculated from the weight of the sea component, weight of the island component, and weight the compatibilizer (in the case where a compatibilizer was used) adopted to produce polymethylpentene conjugate fiber.

C. Melt Viscosity Ratio

Polymethylpentene based resin (a) and thermoplastic resin (b) were vacuum-dried first and left to stand in a nitrogen atmosphere for 5 minutes, and measurements were made using Capilograph 1B (manufactured by Toyo Seiki Co., Ltd.) and a capillary with a hole size of 1.0 mm and hole length of 10 mm. Here, measurements was made at the same temperature as the spinning temperature described in each Example given below, and the apparent viscosity (Pa·s) at a shear velocity of 1216 $sec^{-1}$ was assumed to represent the melt viscosity (Pa·s). Here, three measurements were made for a specimen, and their average was taken as the melt viscosity.

The melt viscosity ratio was calculated by the following equation, where $\eta a$ and $\eta b$ show the melt viscosity of polymethylpentene based resin (a) and that of thermoplastic resin (b), respectively:

melt viscosity ratio $(\eta b / \eta a) = \eta b / \eta a$

D. Fineness

In an environment with a temperature of 20° C. and a humidity of 65% RH, a 100 m fiber specimen taken from the polymethylpentene conjugate fiber (before dissolving out the island component) or porous polymethylpentene fiber (after dissolving out the island component) prepared in each Example was wound into a hank using an electric sizing reel manufactured by INTEC. The weight of the resulting hank was measured and its fineness (dtex) was calculated by the following equation. Here, five measurements were made for a specimen, and their average was taken as its fineness.

fineness (dtex)=weight (g) of fiber (100 m)×100

E. Strength and Elongation Percentage

The strength and elongation percentage of specimens of the polymethylpentene conjugate fiber (before dissolving out the island component) or porous polymethylpentene fiber (after dissolving out the island component) prepared in each Example were calculated according to 8.5 of JIS L 1013 (1999) (Test method for chemical fiber filament yarn). In an environment with a temperature of 20° C. and a humidity of 65% RH, a tensile test was performed using Autograph AG-50NISMS (manufactured by Shimadzu Corporation) under the conditions of an initial specimen length of 20 cm and tension speed of 20 cm/min. The strength (cN/dtex) was calculated by dividing the stress (cN) at the point showing the maximum load by the fineness (dtex) and the elongation percentage (%) was calculated by the following equation from the elongation (L1) at the point showing the maximum load and the initial specimen length (L0). Here, ten measurements were made for a specimen, and their average was taken as its strength and elongation percentage.

elongation percentage (%)={$(L1-L0)/L0$}×100

F. Initial Tensile Resistance

The initial tensile resistance of a specimen of the polymethylpentene conjugate fiber (before dissolving out the island component) or porous polymethylpentene fiber (after dissolving out the island component) prepared in each Example was calculated according to 8.10 of JIS L 1013 (1999) (Test method for chemical fiber filament yarn). Measurements were made as in the above paragraph E and a load-elongation curve was drawn. In the vicinity of the origin, a maximum in the load-stretch curve was determined and the initial tensile resistance (cN/dtex) was calculated by the equation described in 8.10 of JIS L 1013 (1999) (Test method for chemical fiber filament yarn). Here, five measurements were made for a specimen, and their average was taken as its initial tensile resistance.

G. Content of Remaining Thermoplastic Resin (%)

The porous polymethylpentene fiber (after dissolving out the island component) prepared in each Example was circular-knitted to provide a specimen and its weight W0 (g) was measured after drying at 60° C. for 2 hours in a drier. Subsequently, the specimen was immersed in a solvent under the same conditions as in each Example, rinsed, and dried at 60° C. for 2 hours in a drier, followed by measuring its weight W1 (g). The steps of immersion in the solvent, rinsing, and drying were performed repeatedly until the specimen no longer showed changes in weight. The weight W2 (g) was determined at the point where the specimen no longer showed changes in weight and the content (%) of the remaining thermoplastic resin was calculated by the following equation:

content of remaining thermoplastic resin (%)= $\{(W1-W2)/W0\}\times100$

H. Average Fiber Diameter, Dispersion Diameter of Island Domains, Average Diameter of Pores Platinum-palladium alloy was deposited on the polymethylpentene conjugate fiber (before dissolving out the island component) or porous polymethylpentene fiber (after dissolving out the island component) prepared in each Example and the cross section perpendicular to the fiber axis, i.e. the fiber cross section, was observed using a S-4000 scanning electron microscope (SEM) manufactured by Hitachi, Ltd., followed by taking a microphotograph of the fiber cross section. To determine the average fiber diameter, 30 fibers taken at random were observed at a magnification of 300× and their diameters were measured and averaged to calculate the average fiber diameter (μm). To determine the dispersion diameter of the island domains and the average diameter of the pores, observation was performed at a magnification of 300×, 500×, 1,000×, 3,000×, 5,000×, 10,000×, 30,000×, or 50,000× and microphotographs were taken at the lowest magnification that could give a view containing 100 or more island domains or pores. In regard to the photographs thus taken, the diameter was measured for 100 island domains or pores selected randomly from each photograph and the average of the measurements was taken as the dispersion diameter (μm) of the island domains or the average diameter (μm) of the pores. The island domains and pores existing in a fiber cross section did not necessarily have a perfect circular shape. For each of those of a non-perfect circle, its area was measured and converted into the diameter of a perfect circle, which was adopted as the dispersion diameter of the island domain or the diameter of the pore.

When the fiber cross section of a single yarn did not contain as many as 100 island domains or pores, a plurality of single yarns produced under the same conditions were used as specimens for fiber cross section observation. When taking a microphotograph, photographing was performed at the highest magnification at which the entire single yarn could be observed. For the photographs thus taken, the dispersion diameter of the island domains or the average diameter of the pores in the fiber cross section of each single yarn were measured and the average of the 100 measurements of the dispersion diameter of island domains or the diameter of pores was taken to represent the dispersion diameter of the island domains or the diameter of the pores.

I. Coefficient of Variation CV of Dispersion Diameter of Island Domains or Diameter of Pores First, the standard deviation ($\sigma_{ALL}$) and the average ($D_{ALL}$) were calculated for the dispersion diameter of 100 island domains or the diameter of 100 pores measured in the above paragraph H, and then the coefficient of variation CV(%) of the dispersion diameter of the island domains or the diameter of the pores were calculated by the following equation:

coefficient of variation CV(%)=$(\sigma_{ALL}/D_{ALL})\times100$

J. Specific Gravity

The specific gravity of a specimen of the polymethylpentene conjugate fiber (before dissolving out the island component) prepared in each Example was calculated according to 8.17 (Sink-float method) of JIS L 1013 (1999) (Test method for chemical fiber filament yarn). A specific gravity measuring liquid was prepared using water as heavy liquid and ethyl alcohol as light liquid. In a temperature controlled bath of a temperature of 20±0.1° C., a fiber specimen of about 0.1 g was left in the specific gravity measuring liquid for 30 minutes and then the sink-and-float state of the specimen was observed. Either the heavy liquid or the light liquid was added depending on the sink-and-float state and the specimen was left to stand for additional 30 minutes. After confirming that the specimen was in an equilibrium sink-and-float state, the specific gravity of the specific gravity measuring liquid was measured and then the specific gravity of the specimen was calculated. Here, five measurements were made for a specimen, and their average was taken as its specific gravity.

K. Porosity and Specific Gravity

The porosity (%) and apparent density (g/cm$^3$) of the porous polymethylpentene fiber (after dissolving out the island component) prepared in each Example were measured by mercury intrusion porosimetry using an Autopore IV9510 porosimeter manufactured by Shimadzu Corporation. For the present invention, the apparent density is referred to as specific gravity. Here, three measurements were made for a specimen, and their average was taken as its porosity or specific gravity.

L. Specific Gravity Increase Rate

The porous polymethylpentene fiber (after dissolving out the island component) prepared in each Example was twisted 1,500 turns/m and then untwisted, followed by calculating the specific gravity as in the above paragraph K. The specific gravity increase rate was calculated by the following equation from the specific gravity Ha before the twisting and the specific gravity Hb after the twisting:

specific gravity increase rate (%)=$\{(Hb-Ha)/Ha\}\times 100$

M. L* Value

The polymethylpentene conjugate fiber (before dissolving out the island component) or porous polymethylpentene fiber (after dissolving out the island component) prepared in each Example was circular-knitted to prepare a specimen, which was degummed at 70° C. for 20 minutes and subjected to dry heat setting at 160° C. for 2 minutes, followed by dyeing by an ordinary method. The L* value of the dyed specimen was measured using a CM-3700d spectrophotometer (manufactured by Minolta) with a D65 light source and view angle of 10° under SCE (specular component excluded) optical conditions. Here, three measurements were made for a specimen, and their average was taken as its L* value. The dyeing methods that were used for different fibers are as described below.

When polyethylene terephthalate (PET), polypropylene terephthalate (PPT), polylactic acid (PLA), cellulose diacetate (CDA), or cellulose acetate propionate (CAP) was used as thermoplastic resin, Kayalon Polyester Black EX-SF200, a disperse dye manufactured by Nippon Kayaku Co., Ltd., was adopted to dye it. A circular-knitted specimen was dyed with a dye solution containing 4 wt % of the dye and adjusted to pH 5.0 under the conditions of a bath ratio of 1:100 and a dyeing time of 60 minutes. Here, the dyeing temperature was 100° C. for PET and 130° C. for PPT, PLA, CDA, and CAP.

When nylon 6 (N6) or nylon 66 (N66) was used as thermoplastic resin, Kayanol Milling Black TLB, an acidic dye manufactured by Nippon Kayaku Co., Ltd., was adopted to dye it. A circular-knitted specimen was dyed with a dye solution containing 8 wt % of the dye and adjusted to pH 4.5 under the conditions of a bath ratio of 1:100, dyeing temperature of 100° C., and a dyeing time of 60 minutes.

When polymethyl methacrylate (PMMA) or maleic anhydride modified polypropylene (MPP) was used as thermoplastic resin, Kayacryl Black YA, a cationic dye manufactured by Nippon Kayaku Co., Ltd., was adopted to dye it. A circular-knitted specimen was dyed with a dye solution containing 8 wt % of the dye and adjusted to pH 4.0 under the conditions of a bath ratio of 1:100, dyeing temperature of 100° C., and a dyeing time of 60 minutes.

N. Lightweight Property

For the polymethylpentene conjugate fiber (before dissolving out the island component) prepared in each Example, lightweight property was evaluated based on the specific gravity of the fiber calculated in the above paragraph J and ranked according to a four level criterion. Results are shown as ⊚, ○, Δ, or x. To show the evaluation results, ⊚ represents the highest quality level, and ○, Δ, and x represent lower, still lower, and the lowest quality levels, respectively. A specimen was ranked as ⊚ when the specific gravity of the fiber was less than 1.0, ○ when it was 1.0 or more and less than 1.1, Δ when it was 1.1 or more and less than 1.2, and x when it was 1.2 or more, and judged as acceptable when it was ranked as ○ (1.0 or more and less than 1.1) or higher. For the porous polymethylpentene fiber (after dissolving out the island component) prepared in each Example, lightweight property was evaluated based on the specific gravity of the fiber as calculated in the above paragraph K and ranked according to a four level criterion. Results are shown as ⊚, ○, Δ, or x. To show the evaluation results, ⊚ represents the highest quality level, and ○, Δ, and x represent lower, still lower, and the lowest quality levels, respectively. A specimen was ranked as ⊚ when the specific gravity of the fiber was 0.7 or less, ○ when it was more than 0.7 and 0.8 or less, and x when it was more than 0.8, and judged as acceptable when it was ranked as ⊚ or ○.

O. Resistance of Hollows

For the porous polymethylpentene fiber (after dissolving out the island component) prepared in each Example, hollow resistance was evaluated based on the specific gravity increase rate as calculated in the above paragraph L and ranked according to a four level criterion. Results are shown as ⊚, ○, Δ, or x. To show the evaluation results, ⊚ represents the highest quality level, and ○, Δ, and x represent lower, still lower, and the lowest quality levels, respectively. A specimen was ranked as ⊚ when the specific gravity increase rate was less than 5%, ○ when it was 5% or more and less than 10%, and x when it was 10% or more, and judged as acceptable when it was ranked as ⊚ or ○.

P. Color Developing Property

The color developing property was evaluated based on the L* value of a circular-knitted specimen dyed as in the above paragraph M and ranked according to a four level criterion. Results are shown as ⊚, ○, Δ, or x. To show the evaluation results, ⊚ represents the highest quality level, and ○, Δ, and x represent lower, still lower, and the lowest quality levels, respectively. A specimen was evaluated as ⊚ when the L* value was less than 40, ○ when it was 40 or more and less than 50, Δ when it was 50 or more and less than 60, and x when it was 60 or more, and judged as acceptable when it was ranked as ○ (40 or more and less than 50) or higher.

Q. Washing Fastness

Washing fastness evaluation was carried out according to A-2 of JIS L 0844 (2004) (Test method for color fastness to washing). Using a Laundermeter tester manufactured by Daiei Kagaku Seiki Mfg. Co., Ltd., a circular-knitted specimen dyed as in the above paragraph M was subjected to laundering treatment along with a piece of white cloth attached to the tester, and the degree of discoloration of the specimen was determined with reference to a discoloration gray scale as specified in JIS L 0804 (2004). The washing fastness was evaluated in terms of the degree of stain on the attached white cloth determined with reference to a stain gray scale as specified in JIS L 0805 (2005). Here, the washing fastness is evaluated as classes 1 to 5 in 0.5 increments, with classes 5 and 1 representing the highest and lowest quality levels, respectively. The washing fastness was indicated by ⊚ for class 4 or higher and lower than class 5, ○ for class 3 or higher and lower than class 4, Δ for class 2 or higher and lower than class 3, or x for lower than class 2, and the specimen was judged as acceptable when it was ranked as ○ (class 3 or higher and lower than class 4) or higher.

R. Rubbing Fastness

Rubbing fastness evaluation was carried out according to 7.1 of JIS L 0849 (2004) (Test method for color fastness to rubbing). Using a Gakushin-Type Rubbing Tester RT-200 manufactured by Daiei Kagaku Seiki Mfg. Co., Ltd., a circular-knitted specimen dyed as in the above paragraph M was rubbed with white cotton cloth (Kanakin No. 3), and its rubbing fastness was evaluated based on the degree of stain on the white cotton cloth determined with reference to a stain gray scale as specified in JIS L 0805 (2005). Here, the rubbing fastness is evaluated as classes 1 to 5 in 0.5 increments, with classes 5 and 1 representing the highest and lowest quality levels, respectively. The rubbing fastness was indicated by ⊚ for class 4 or higher and lower than class 5, ○ for class 3 or higher and lower than class 4, Δ for class 2 or higher and lower than class 3, or x for lower than class 2, and the specimen was judged as acceptable when it was ranked as ○ (class 3 or higher and lower than class 4) or higher.

S. Light Fastness

Light fastness evaluation was carried out according to JIS L 0842 (2004) (Test method for color fastness to ultraviolet light of carbon-arc lamp). Using an Ultraviolet Auto Fade Meter U48AU manufactured by Suga Test Instrument Co., Ltd., a circular-knitted specimen dyed as in the above paragraph I was exposed to light from a carbon-arc lamp, and its light fastness was evaluated based on the degree of discoloration of the specimen determined with reference to a discoloration gray scale as specified in JIS L 0804 (2004). Here, the light fastness is evaluated as classes 1 to 5 in 0.5 increments, with classes 5 and 1 representing the highest and lowest quality levels, respectively. The light fastness was indicated by ⊚ for class 4 or higher and lower than class 5, ○ for class 3 or higher and lower than class 4, Δ for class 2 or higher and lower than class 3, or x for lower than class 2, and the specimen was judged as acceptable when it was ranked as ○ (class 3 or higher and lower than class 4) or higher.

T. Levelness of Dyeing

The porous polymethylpentene fiber prepared in each Example was dyed by the same method as in the above paragraph M and subjected to observation of a section perpendicular to the fiber axis, i.e. fiber cross section, using a VHX-8500 microscope manufactured by Keyence Corporation. The levelness of dyeing was evaluated according to a four level criterion (represented as ⊚, ○, Δ, or x) based on the stained state of the fiber cross section. To show the evaluation results, ⊚ represents the highest quality level, and ○, Δ, and x represent lower, still lower, and the lowest quality levels, respectively. A specimen was ranked as ⊚ when the fiber cross section was found dyed uniformly, ○ when the fiber cross section was found dyed nearly uniformly, Δ when the fiber cross section was found dyed slightly, and x when the fiber cross section was found little dyed. When the specimen was ranked as ○ (the fiber cross section as found dyed nearly uniformly) or higher, it was judged as acceptable with vivid color developed from the interior of the fiber (○) or acceptable with excellent vivid color developed from the interior of the fiber (⊚).

U. Dyeing Specks

Circular-knitted specimens dyed as in the above paragraph M were evaluated according to a four level criterion (represented as ◎, ○, Δ, and x) based on a consultation by five examiners having 5-year or longer experience in quality evaluation. To show the evaluation results, ◎ represents the highest quality level, and ○, Δ, and x represent lower, still lower, and the lowest quality levels, respectively. A specimen was ranked as ◎ when it was found dyed highly uniformly with no dyeing specks detected, ○ when it was found dyed nearly uniformly with almost no dyeing specks detected, Δ when it was found dyed little uniformly with slight dyeing specks detected, and x when it was found not dyed uniformly with clear dyeing specks detected. The specimen was judged as acceptable when it was ranked as ○ (the fiber cross section was found dyed nearly uniformly with almost no dyeing specks detected) or higher.

Example 1

Using a twin screw extruder, 80 wt % of polymethylpentene (PMP) (DX820, manufactured by Mitsui Chemicals, Inc., melting point 232° C., MFR 180 g/10 min) used as sea component and 20 wt % of polylactic acid (PLA) (melting point 168° C., weight average molecular weight 145,000) used as island component were kneaded at a kneading temperature of 260° C. The strand discharged from the twin screw extruder was cooled in water and then cut by a pelletizer at intervals of about 5 mm to provide pellets. Here, the melt viscosity ratio between the sea component and the island component was 1.7. The pellets obtained were vacuum-dried at 95° C. for 12 hours and supplied to an extruder type melt spinning machine in which they were melted and discharged through a spinning nozzle (discharge hole size 0.3 mm, discharge hole length 0.6 mm, number of holes 36, round holes) at a spinning temperature 260° C. to provide spun threads. These spun threads were cooled in a cooling air flow with an air temperature of 20° C. and flow speed of 25 m/min, collected while supplying oil from an oil feeder, taken up by a first godet roller rotating at 1,000 m/min, wound up by a winder via a second godet roller rotating at the same speed as the first godet roller to provide an unstretched yarn of 180 dtex-36f. The unstretched yarn obtained was stretched under the conditions of a first hot roller temperature of 90° C., second hot roller temperature of 130° C., and draw ratio of 1.8 to provide a stretched yarn of 100 dtex-36f. Using a circular knitting machine, a circular-knitted fabric was prepared from the resulting stretched yarn of polymethylpentene conjugate fiber, and it was then degummed, subjected to dry heat setting, and dyed by the aforementioned methods.

Table 1 shows evaluation results on fiber characteristics of the resulting polymethylpentene conjugate fiber and characteristics of the circular-knitted fabric of the polymethylpentene conjugate fiber. The polymethylpentene conjugate fiber obtained had a specific gravity of 0.92 and accordingly had very good lightweight property. Furthermore, polylactic acid with good color developing property was found to form island domains that were finely dispersed in a sea domain of polymethylpentene with a low refractive index, resulting in a fabric specimen entirely dyed vividly and uniformly, indicating an excellent color developing property. Furthermore, it had acceptable level of fastness to washing, rubbing, and light.

Example 2

Except for using polymethylpentene (PMP) (RT18, manufactured by Mitsui Chemicals, Inc., melting point 232° C., MFR 26 g/10 min) as sea component, polymethylpentene conjugate fiber and circular-knitted fabric were prepared in the same way as in Example 1, and it was degummed, subjected to dry heat setting, and dyed. Here, the melt viscosity ratio between the sea component and the island component was 1.1.

Table 1 shows evaluation results on fiber characteristics of the resulting polymethylpentene conjugate fiber and fabric characteristics of the circular-knitted fabric of the polymethylpentene conjugate fiber. The melt viscosity ratio between the sea component and the island component is low and the dispersion diameter of the island domains is small, resulting in a low L* value and development of deep, vivid colors. It also had excellent lightweight property and had acceptable level of fastness to washing, rubbing, and light.

Examples 3 to 5

Except for changing the content ratio between the sea component and the island component as shown in Table 1, polymethylpentene conjugate fiber and circular-knitted fabric were prepared in the same way as in Example 1, and it was degummed, subjected to dry heat setting, and dyed.

Table 1 shows evaluation results on fiber characteristics of the resulting polymethylpentene conjugate fiber and fabric characteristics of the circular-knitted fabric of the polymethylpentene conjugate fiber. In Example 3, the fabric had good lightweight property though slightly high in specific gravity due to a larger proportion of polylactic acid and had acceptable level of fastness to washing, rubbing, and light though slightly lower than the above. Its color developing property was excellent. In Example 4, the fabric had good lightweight property and color developing property and also gave acceptable results in the various fastness tests, thus proving excellent fabric characteristics. In Example 5, the entire fabric specimen was found dyed vividly and uniformly though slightly high in L* value due to a smaller proportion of polylactic acid, and the fabric was also acceptable in other fabric characteristics.

Examples 6 and 7

The sea component of polymethylpentene (PMP) (DX820, manufactured by Mitsui Chemicals, Inc., melting point 232° C., MFR 180 g/10 min) and the island component of polylactic acid (PLA) (melting point 168° C., weight average molecular weight 145,000) were vacuum-dried at 95° C. for 12 hours, and then 80 wt % of the sea component and 20 wt % of the island component were supplied to a pressure melter type conjugate spinning machine, in which they were melted separately and discharged at a spinning temperature of 260° C. through a spinning nozzle designed for sea-island conjugate fiber production (discharge hole size 0.3 mm, discharge hole length 0.6 mm, number of holes 36, round holes) to provide spun threads. The spinning nozzle designed for sea-island conjugate fiber production used in Example 6 was configured for eight island domains and that used in Example 7 was configured for 32 island domains. These spun threads were cooled in a cooling air flow with an air temperature of 20° C. and flow speed of 25 m/min, collected while supplying oil from an oil feeder, taken up by a first godet roller rotating at 1,000 m/min, wound up by a winder via a second godet roller rotating at the same speed as the first godet roller to provide an unstretched yarn of 180 dtex-36f. The unstretched yarn obtained was stretched under the conditions of a first hot roller temperature of 90° C., second hot roller temperature of 130° C., and draw ratio of 1.8 to provide a stretched yarn of 100 dtex-36f. Using a circular knitting machine, a circular-knitted fabric was prepared from the resulting stretched yarn of polymethylpentene conjugate fiber, and it was then degummed, subjected to dry heat setting, and dyed by the aforementioned methods.

Table 1 shows evaluation results on fiber characteristics of the resulting polymethylpentene conjugate fiber and characteristics of the circular-knitted fabric of the polymethylpentene conjugate fiber. In Example 6, the number of island domains was 8 and the possibility that light passing through the sea domain reaches dyed island domains was slightly lower, leading to a slightly higher L* value, but the entire fabric specimen was dyed vividly and uniformly, proving good color developing property. Furthermore, the fabric gave excellent results in the lightweight property and various fastness tests. In Example 7, the number of island domains was 32 and transmitted light toward dyed island domains and reflected light from island domains were mixed randomly to give a lower L* value and deep, vivid colors. The fabric was also acceptable in other fabric characteristics. In Examples 6 and 7, island domains of polylactic acid with good color developing property were finely dispersed in a sea domain of polymethylpentene with a low refractive index, making it possible to provide polymethylpentene conjugate fiber with excellent color developing property.

Example 8

Except for adding 5 wt % (as outer percentage) of amino-modified styrene-ethylene-butylene-styrene copolymer (SEBS) (Dynalon 8630P, manufactured by JSR Corporation) as compatibilizer, the same procedure as in Example 1 was carried out to produce polymethylpentene conjugate fiber and a circular-knitted fabric specimen, followed by degumming, dry heat setting, and dyeing. Here, PMP, PLA, and SEBS had a content ratio (by weight) of 80/20/5, which is equivalent to 76.2/19.0/4.8 in percentage of the total weight (100) of PMP, PLA, and SEBS.

Table 1 shows evaluation results on fiber characteristics of the resulting polymethylpentene conjugate fiber and fabric characteristics of the circular-knitted fabric of the polymethylpentene conjugate fiber. The addition of the compatibilizer worked to improve the compatibility between polymethylpentene and polylactic acid to decrease the dispersion diameter of the island component and lower the L* value, resulting in excellent deep, vivid color developing property. The fabric also had excellent lightweight properties and had acceptable quality in terms of fastness to washing, rubbing, and light.

Examples 9 to 16

The island component was changed from polylactic acid to other thermoplastic resins as shown in Table 2. The thermoplastic resins used were polyethylene terephthalate (PET) (T701T, manufactured by Toray Industries, Inc., melting point 257° C.) in Example 9, polypropylene terephthalate (PPT) (Corterra CP513,000, manufactured by Shell, melting point 225° C.) in Example 10, nylon 6 (N6) (Amilan CM1017, manufactured by Toray Industries, Inc., melting point 225° C.) in Example 11, nylon 66 (N66) (CM3001-N, manufactured by Toray Industries, Inc., melting point 265° C.) in Example 12, polymethyl methacrylate (PMMA) (Acrypet VH000, manufactured by Mitsubishi Rayon Co., Ltd., melting point 140° C.) in Example 13, maleic anhydride modified polypropylene (MPP) (Yumex 1010, manufactured by Sanyo Chemical Industries Ltd., melting point 142° C.) in Example 14, cellulose acetate propionate (CAP) (CAP-482-20, manufactured by Eastman Chemical Company, melting point 195° C.) in Example 15, and cellulose diacetate (CDA) (Acety, manufactured by Daicel, containing 22% diethyl phthalate, melting point 160° C.) in Example 16. For polymethylpentene, RT18 manufactured by Mitsui Chemicals, Inc., was used in Examples 9 and 11 to 13 and DX820 manufactured by Mitsui Chemicals, Inc., was used in Examples 10 and 14 to 16. The spinning temperature was 290° C. in Examples 9 and 12, 260° C. in Examples 10, 11, 13, and 14, and 240° C. in Examples 15 and 16. The other conditions were the same as in Example 1 for preparing polymethylpentene conjugate fiber and a circular-knitted fabric specimen, followed by degumming, dry heat setting, and dyeing. Here, the melt viscosity ratio between the sea component and the island component was as shown in Table 2.

Table 2 shows evaluation results on fiber characteristics of the resulting polymethylpentene conjugate fiber and fabric characteristics of the circular-knitted fabric of the polymethylpentene conjugate fiber. Though some thermoplastic resins gave specimens with slightly lower color developing property and fastness to light, all thermoplastic resins gave specimens containing island domains finely dispersed in a sea domain and having good color developing property and acceptable quality in terms of lightness and fastness to washing, rubbing, and light.

Comparative Example 1

Except for adding no island component and using polymethylpentene as monocomponent, the same procedure as in Example 1 was carried out to produce polymethylpentene fiber and a circular-knitted fabric specimen, followed by degumming, dry heat setting, and dyeing. Here, the same disperse dye as in Example 1 was used for dyeing.

Table 3 shows evaluation results on fiber characteristics of the resulting polymethylpentene fiber and fabric characteristics of the circular-knitted fabric of the polymethylpentene fiber. Since polymethylpentene has no polar functional group, it cannot be dyed effectively with a dye, resulting in poor color developing property.

Comparative Examples 2-4

Except for using spinning nozzle designed for core-sheath conjugate fiber production (discharge hole size 0.3 mm, discharge hole length 0.6 mm, number of holes 36, round holes) and adopting the content ratios between the core component and the sheath component shown in Table 3, the same procedure as in Example 6 was carried out to produce polymethylpentene conjugate fiber and a circular-knitted fabric specimen, followed by degumming, dry heat setting, and dyeing It should be noted that the sea component corresponds to the sheath component while the island component corresponds to the core component in Comparative examples 2 to 4.

Table 3 shows evaluation results on fiber characteristics of the resulting polymethylpentene conjugate fiber and characteristics of the circular-knitted fabric of the polymethylpentene conjugate fiber. In Comparative example 2, although the polylactic acid of the core component was dyed well, it is covered with the polymethylpentene of the sheath component, leading to a high L* value and failing to give deep, vivid colors. In Comparative examples 3 and 4, although the content ratio was changed to increase the content of polylactic acid, the color developing property was not improved, leading to fabric specimens with inferior color developing property. When core-sheath type conjugate fiber was prepared as in Comparative examples 2 to 4, transmitted light toward dyed island domains and reflected light from island domains were not mixed randomly, failing to impart color developing property to the polymethylpentene based resin.

Comparative Example 5

Using a twin screw extruder, 80 wt % of high density polyethylene (HDPE) (HI-ZEX 2200J, manufactured by Prime Polymer Co., Ltd., melting point 135° C.) used as sea component and 20 wt % ethylene-vinyl acetate copolymer (EVA) (Evaflex EV150, manufactured by Dupont Mitsui, melting point 61° C.) used as island component were kneaded at a kneading temperature 155° C. The strand discharged from the twin screw extruder was cooled in water and then cut by a pelletizer at intervals of about 5 mm to provide pellets. Here, the melt viscosity ratio between the sea component and the island component was 2.8. The pellets obtained were vacuum-dried at 95° C. for 12 hours and supplied to an extruder type melt spinning machine in which they were melted and discharged through a spinning nozzle (discharge hole size 0.3 mm, discharge hole length 0.6 mm, number of holes 36, round holes) at a spinning temperature 155° C. to provide spun threads. These spun threads were cooled in a cooling air flow with an air temperature of 20° C. and flow speed of 25 m/min, collected while supplying oil from an oil feeder, taken up by a first godet roller rotating at 250 m/min, wound up by a winder via a second godet roller rotating at the same speed as the first godet roller to provide an unstretched yarn of 100 dtex-36f. Using a circular knitting machine, a circular-knitted fabric was prepared from the resulting unstretched yarn of high density polyethylene conjugate fiber, and it was then degummed, subjected to dry heat setting, and dyed by the aforementioned methods. Here, the acidic dye described in the above paragraph M was used for dyeing.

Table 3 shows evaluation results on fiber characteristics of the resulting high density polyethylene conjugate fiber and characteristics of the circular-knitted fabric of the high density polyethylene conjugate fiber. Although the resulting high density polyethylene conjugate fiber had good lightweight property, the acidic dye failed to serve sufficiently in dyeing the ethylene-vinyl acetate copolymer, resulting in very poor color developing property. Furthermore, the coefficient of variation CV of the dispersion diameter of the island domains was so large that deep, vivid color developing property could not be obtained.

Comparative Example 6

Except for using polypropylene (PP) (Novatec FY6, manufactured by Japan Polypropylene Corporation, melting point 170° C.) as sea component and performing both kneading and spinning at a temperature of 190° C., the same procedure as in Comparative example 5 was carried out to produce polypropylene conjugate fiber and a circular-knitted fabric specimen, followed by degumming, dry heat setting, and dyeing.

Table 3 shows evaluation results on fiber characteristics of the resulting polypropylene conjugate fiber and characteristics of the circular-knitted fabric of the polypropylene conjugate fiber. Although the resulting polypropylene conjugate fiber had good lightweight property, the acidic dye failed to serve sufficiently in dyeing the ethylene-vinyl acetate copolymer as in Comparative example 5, resulting in very poor color developing property. Furthermore, the coefficient of variation CV of the dispersion diameter of the island domains was so large that deep, vivid color developing property could not be obtained.

Example 17

Using a twin screw extruder, 80 wt % quantity of polymethylpentene (PMP) (DX820, manufactured by Mitsui Chemicals, Inc., melting point 232° C., MFR 180 g/10 min) used as sea component, 15 wt % of polylactic acid (PLA) (melting point 168° C., weight average molecular weight 145,000) used as island component, and 5 wt % of amino-modified styrene-ethylene-butylene-styrene copolymer (SEBS) (Dynalon 8630P, manufactured by JSR Corporation) used as compatibilizer were kneaded at a kneading temperature of 260° C. The strand discharged from the twin screw extruder was cooled in water and then cut by a pelletizer at intervals of about 5 mm to provide pellets. Here, the melt viscosity ratio between the sea component and the island component was 1.7. The pellets obtained were vacuum-dried at 95° C. for 12 hours and supplied to an extruder type melt spinning machine in which they were melted and discharged through a spinning nozzle (discharge hole size 0.3 mm, discharge hole length 0.6 mm, number of holes 36, round holes) at a spinning temperature 260° C. to provide spun threads. These spun threads were cooled in a cooling air flow with an air temperature of 20° C. and flow speed of 25 m/min, collected while supplying oil from an oil feeder, taken up by a first godet roller rotating at 1,000 m/min, wound up by a winder via a second godet roller rotating at the same speed as the first godet roller to provide an unstretched yarn of 180 dtex-36f. The unstretched yarn obtained was stretched under the conditions of a first hot roller temperature of 90° C., second hot roller temperature of 130° C., and draw ratio of 1.8 to provide a stretched yarn of 100 dtex-36f. The resulting stretched yarn of polymethylpentene conjugate fiber was circular-knitted by a circular knitting machine. A wound-up hank of the stretched yarn and the circular-knitted fabric obtained were separately immersed in chloroform at room temperature for 24 hours, and subsequently taken out of the chloroform, rinsed, and dried to provide porous polymethylpentene fiber.

Table 4 shows evaluation results on the fiber characteristics of the resulting porous polymethylpentene fiber. The porous fiber had a high strength, elongation percentage, and initial tensile resistance and showed good mechanical characteristics. FIG. 1 shows a SEM photograph of a fiber cross section of the porous polymethylpentene fiber. The coefficient of variation CV of the pore diameter was 33%, indicating a high pore size uniformity. Here, the average pore diameter was 0.89 μm and the porosity was 16%. The porous fiber had a specific gravity of 0.73 and accordingly had good lightweight property. In addition, the specific gravity increase rate was 1.3% and collapse of the pores was not caused by twisting, proving a very high hollow retention property.

Examples 18 to 20

Except for changing the weight ratio among the sea component, island component, and compatibilizer, kneading, spinning, and stretching were carried out in the same way as in Example 17, followed by dissolving out the island component to provide porous polymethylpentene fiber.

Table 4 shows evaluation results on the fiber characteristics of the resulting porous polymethylpentene fiber. At all weight ratios for conjugate fiber production, the coefficient of variation CV of the pore diameter was 50% or less, proving high pore size uniformity. As the porosity increases, the specific gravity of the porous fiber decreases, enhancing the lightweight property. In Examples 18 and 19, the specimens had good lightweight property though slightly inferior in mechanical characteristics due to a higher porosity compared to Example 17. In Example 20, the porosity was 8% to ensure acceptable level of lightweight property, though slightly inferior compared to Example 1, and good mechanical characteristics were obtained. In any of Examples 18 to 20, the specific gravity increase rate was less than 10%, ensuring good hollow retention property.

Example 21

Except for using 80 wt % of polymethylpentene (PMP) (RT-18, manufactured by Mitsui Chemicals, Inc., melting point 232° C., MFR 26 g/10 min) as sea component and 20 wt % of polylactic acid (PLA) (melting point 168° C., weight average molecular weight 145,000) as island component, kneading, spinning, and stretching were carried out in the same way as in Example 17, followed by dissolving out the island component to provide porous polymethylpentene fiber.

Table 4 shows evaluation results on the fiber characteristics of the resulting porous polymethylpentene fiber. The coefficient of variation CV of the pore diameter was 34%, proving high pore size uniformity and satisfactory level of lightweight property and hollow retention property.

Example 22

The sea component of polymethylpentene (PMP) (DX820, manufactured by Mitsui Chemicals, Inc., melting point 232° C., MFR 180 g/10 min) and the island component of polylactic acid (PLA) (melting point 168° C., weight average molecular weight 145,000) were vacuum-dried at 95° C. for 12 hours, and then 80 wt % of the sea component and 20 wt % of the island component were supplied to a pressure melter type conjugate spinning machine, in which they were melted separately and discharged at a spinning temperature of 260° C. through a spinning nozzle designed for sea-island conjugate fiber production (discharge hole size 0.3 mm, discharge hole length 0.6 mm, number of holes 36, number of island domains 32, round holes) to provide spun threads. Subsequently, spinning and stretched were carried out in the same way as in Example 17, followed by dissolving out the island component to provide porous polymethylpentene fiber.

Table 4 shows evaluation results on the fiber characteristics of the resulting porous polymethylpentene fiber. The dispersion diameter of the island domains was regulated by the sea-island conjugate spinning and accordingly, the coefficient of variation CV of the pore diameter after dissolving out the island component was a good 17%. Furthermore, the specific gravity increase rate after twisting was 8.1% which suggested blocking of part of pores, but the specimen had satisfactory level of hollow retention property.

Examples 23 to 32

The island component was changed from polylactic acid to other thermoplastic resins as shown in Table 5. The thermoplastic resins used were polyethylene terephthalate (PET) (T701T, manufactured by Toray Industries, Inc., melting point 257° C.) in Example 23, copolymerized PET (PET copolymerized with 8 mol % of 5-sodium sulfoisophthalic acid, melting point 240° C.) in Example 24, nylon 6 (N6) (Amilan CM1017, manufactured by Toray Industries, Inc., melting point 225° C.) in Example 25, polymethyl methacrylate (PMMA) (Acrypet VH000, manufactured by Mitsubishi Rayon Co., Ltd., melting point 140° C.) in Example 26, cellulose acetate propionate (CAP) (CAP-482-20, manufactured by Eastman Chemical Company, melting point 195° C.) in Example 27, cellulose diacetate (CDA) (Acety, manufactured by Daicel, containing 22% diethyl phthalate, melting point 160° C.) in Example 28, hydroxypropyl methyl cellulose (HPMC) (Metolose 65SH, manufactured by Shin-Etsu Chemical Co., Ltd.) in Example 29, polyvinyl alcohol (PVA) (JMR-20H, manufactured by Japan VAM & Poval Co., Ltd., melting point 180° C.) in Example 30, polyethylene oxide (PEO) (Alkox E-30, manufactured by Meisei Chemical Works, Ltd., melting point 65° C.) in Example 31, and polystyrene (PS) (Toyostyrol H-45, manufactured by Toyo Styrene Co., Ltd., melting point 230° C.) in Example 32. For polymethylpentene, RT18 manufactured by Mitsui Chemicals, Inc., was used in Examples 23 to 26 and DX820 manufactured by Mitsui Chemicals, Inc., was used in Examples 27 to 32. The spinning temperature was 290° C. in Examples 23, 260° C. in Examples 24 to 26 and 32, and 240° C. in Examples 27 to 31. In regard to other conditions, kneading, spinning, and stretching were carried out in the same way as in Example 21, followed by preparing a circular-knitted specimen using a circular knitting machine. The dissolving-out of the island component was carried out by immersion in 20 wt % sodium hydroxide aqueous solution at 98° C. for 6 hours in Example 23, in 3 wt % sodium hydroxide aqueous solution at 80° C. for 6 hours in Example 24, in 50 wt % aqueous formic acid solution at room temperature for 24 hours in Example 25, in acetone at room temperature for 24 hours in Examples 26 to 28, in water at room temperature for 24 hours in Examples 29 to 31, and in trichloroethylene at room temperature for 24 hours in Example 32, and then the stretched yarn and circular-knitted specimen were taken out of the solvent, rinsed, and dried to provide porous polymethylpentene fiber.

Table 5 shows evaluation results on the fiber characteristics of the resulting porous polymethylpentene fibers. Regardless of the type of thermoplastic resin used, the resulting porous fiber had a high strength, elongation percentage, and initial tensile resistance and showed good mechanical characteristics. Also regardless of the type of thermoplastic resin used, the thermoplastic resin was found to be dissolved out completely by the immersion in a solvent. Furthermore, although the average diameter of the pores and the coefficient of variation CV of the pore diameter changed with the combination of a sea component and an island component, acceptable levels of lightweight property and hollow retention property were obtained regardless of the thermoplastic resin used.

Examples 33 to 40

Porous polymethylpentene fiber was prepared under different conditions for dissolving out of the island component: the stretched yarn and circular-knitted specimen prepared in Example 21 were used in Examples 33 and 34 and the stretched yarn and circular-knitted specimen prepared in Examples 23 to 28 were used in Examples 35 to 40, respectively. The conditions for dissolving out the island component were as follows: immersion in chloroform at room temperature for 15 hours in Example 33, in chloroform at room temperature for 6 hours in Example 34, in 20 wt % aqueous sodium hydroxide solution at 98° C. for 1 hour in Example 35, in 3 wt % aqueous sodium hydroxide solution at 80° C. for 30 minutes in Example 36, in 50 wt % aqueous formic acid solution at room temperature for 6 hours in Example 37, and in acetone at room temperature for 15 hours in Examples 38 to 40, followed by taking the stretched yarn and circular-knitted specimen out of the solvent, rinsing, and drying. Subsequently, they were degummed, subjected to dry heat setting, and dyed by the aforementioned methods.

Table 6 shows evaluation results on the fiber characteristics of the resulting porous polymethylpentene fiber. In any Example, the dissolving-out time for the island component was shortened so that part of the thermoplastic resin of the island component would remain in the porous polymethylpentene fiber. Comparison among Examples 21, 33, and 34 showed that the content of the remaining thermoplastic resin tended to decrease with an increasing dissolving-out time for the island component. In any of Examples 33 to 40, furthermore, acceptable levels of mechanical characteristics, lightweight property, and hollow retention property were obtained. Furthermore, good color developing property was achieved by dyeing the thermoplastic resin in the porous fiber, and the porous polymethylpentene fiber had a satisfactory level of color developing property.

Comparative Example 7

Except that the polymethylpentene adopted in Example 17 was used alone, spinning and stretching were carried out in the same way as in Example 17 to provide a stretched yarn of polymethylpentene fiber.

Table 7 shows evaluation results on the fiber characteristics of the resulting stretched yarn of polymethylpentene fiber. Though its specific gravity was 0.83, which is smaller as compared with other synthetic fibers, it still exceeds 0.80, suggesting that good lightweight property was not achieved. Since the fiber was solid and had no pores, twisting and untwisting performed as in Example 17 did not cause a change in its specific gravity.

Comparative Example 8

The unstretched yarns obtained in Comparative example 7 was heat-treated at 150° C. and then stretched in the same way as in Example 17 to provide a stretched yarn of polymethylpentene fiber containing pores. These pores resulted from boundary separation between crystalline parts and amorphous parts in the fiber that was caused by stretching.

Table 7 shows evaluation results on the fiber characteristics of the resulting stretched yarn of hollow polymethylpentene fiber. The existence of pores resulting from boundary separation between crystalline parts and amorphous parts that was caused by stretching led to a specific gravity of 0.78, which indicates good lightweight property. On the other hand, the coefficient of variation CV of the diameter of the pores resulting from boundary separation was 80%, which indicates a large variation in pore diameter. Furthermore, because of the large variation of pore diameter, twisting caused collapse of pores and the specific gravity increase rate was a large 12.1%, resulting in inferior hollow retention property. Thus, in the case where pores were formed as a result of boundary separation between crystalline parts and amorphous parts caused by stretching, the variation of pore diameter was large and accordingly, the pore resistance to external force was not at a satisfactory level although it was possible to make the yarn lighter.

Comparative Example 9

Except that the polymethylpentene adopted in Example 17 was used alone and that a hollow type spinning nozzle (discharge hole size 0.3 mm, discharge hole length 0.6 mm, number of holes 36) was used to produce hollow fiber containing one continuous hollow at the center, spinning and stretching were carried out in the same way as in Example 17 to provide a stretched hollow yarn of polymethylpentene fiber in which the hollow accounted for 20%. Here, since the hollow fiber yarn produced in Comparative example 7 had only one hollow, it was not what can be called porous fiber and was essentially different from the one according to the present invention and it was not compatible with the concepts of the coefficient of variation CV of the pore diameter in the fiber cross section and the average diameter of the pores. For reference, 100 of these single yarns were observed to determine their hollow diameters and the coefficient of variation CV of their hollow diameters and the average diameter of the hollows were calculated. The coefficient of variation CV calculated in Comparative example 7 serves as a measure to represent the uniformity in hollow size among the single yarns and it is presented here as reference date.

Table 7 shows evaluation results on the fiber characteristics of the resulting stretched yarn of hollow polymethylpentene fiber. Because hollows existed at the center of each fiber yarn with a volume occupancy of 20%, the specific gravity was 0.66, showing good lightweight property. In addition, since the hollow diameter was regulated by the hollow type spinning nozzle, the coefficient of variation CV of the hollow diameter was 15%, showing high hollow diameter uniformity among the single yarns. When twisted, however, almost all hollows collapsed with a specific gravity increase rate of as high as 19.0%, showing inferior hollow resistance. Thus, the hollow fiber yarns were low in resistance to external force although they had good lightweight property and hollow diameter uniformity among single yarns.

Comparative Example 10

The unstretched yarns obtained in Comparative example 9 was heat-treated at 150° C. and then stretched in the same way as in Example 17 to provide a stretched yarn of polymethylpentene fiber containing pores in addition to a hollow. These pores resulted from boundary separation between crystalline parts and amorphous parts in the fiber that was caused by stretching. In Comparative example 10, the fiber cross section contained both voids originating from the hollow and pores caused by stretching. In Comparative example 10, the diameter of the hollow was excluded and the coefficient of variation CV of the pore diameter and the average diameter of pores were calculated from the diameters of the pores resulting from stretching. Note that the average diameter of the hollows in 100 single yarns was 5.8 μm.

Table 7 shows evaluation results on the fiber characteristics of the resulting stretched yarn of hollow polymethylpentene fiber. Since there were pores resulting from boundary separation between crystalline parts and amorphous parts caused by stretch in addition to the hollows with a volume occupancy of 20% existing at the center of each fiber yarn, the specific gravity was 0.60, showing good lightweight property. On the other hand, the coefficient of variation CV of the diameter of the pores resulting from boundary separation was 65%, which indicates a large variation in pore diameter. When twisted, furthermore, almost all hollows collapse and in addition, the pores resulting from stretching, which had a large pore diameter variation, also collapsed, leading to a specific gravity increase rate of a high 24.7%, which showed inferior hollow resistance. Thus, when voids originating from the hollows coexisted with pores caused by stretching, not only the hollows collapsed but the pores resulting from stretching also collapsed due to a large pore diameter variation, leading to unsatisfactory level of pore resistance to external force, although lightweight property was imparted.

Comparative Examples 11 and 12

In a nitrogen atmosphere, the unstretched yarns prepared in Comparative examples 5 and 6 were heat-treated under constant length conditions at 115° C. for 24 hours and then stretched by a first hot roller and a second hot roller, both controlled at 25° C., at a draw ratio of 1.8. Furthermore, they were stretched 3.4 times in a 2 m long heating cylinder heated at 115° C. and then subjected to relaxing heat setting to an 80% length in a 2 m long heating cylinder heated at 115° C. to provide stretched yarns of pore-containing high density polyethylene conjugate fiber or polypropylene conjugate fiber. These pores resulted from boundary separation between the high density polyethylene or polypropylene and the ethylene-vinyl acetate copolymer in the conjugate fiber that was caused by stretching.

Table 7 shows evaluation results on the fiber characteristics of the resulting stretched yarns of high density polyethylene conjugate fiber or polypropylene conjugate fiber. Because of the existence of pores resulting from boundary separation caused by stretching, the yarns had a very low specific gravity and very good lightweight property. However, the coefficient of variation CV of the diameter of the pores resulting from boundary separation was large, which indicates a large variation in pore diameter. Accordingly, twisting caused collapse of almost all pores, leading to a large specific gravity increase rate and very poor hollow resistance.

TABLE 1

|  |  | Example 1 | Example 2 | Example 3 | Example 4 | Example 5 | Example 6 | Example 7 | Example 8 |
|---|---|---|---|---|---|---|---|---|---|
| sea-island conjugate production conditions | sea component (a) | PMP | PMP | PMP | PMP | PMP | PMP | PMP | PMP |
|  | island component (b) | PLA | PLA | PLA | PLA | PLA | PLA | PLA | PLA |
|  | sea/island/compatibilizer [weight ratio] | 80/20/0 | 80/20/0 | 50/50/0 | 70/30/0 | 90/10/0 | 80/20/0 | 80/20/0 | 76.2/19.0/4.8 |
|  | sea-island melt viscosity ratio ($\eta b/\eta a$) | 1.7 | 1.1 | 1.7 | 1.7 | 1.7 | 1.7 | 1.7 | 1.7 |
|  | sea-island structure formation method | alloy type | alloy type | alloy type | alloy type | alloy type | sea-island | sea-island | alloy type |
| fiber characteristics of polymethylpentene conjugate fiber | fineness [dtex] | 100 | 100 | 100 | 100 | 100 | 100 | 100 | 100 |
|  | strength [cN/dtex] | 2.2 | 3.0 | 0.9 | 1.7 | 2.5 | 2.7 | 2.4 | 2.6 |
|  | elongation percentage [%] | 25 | 18 | 30 | 27 | 20 | 23 | 26 | 27 |
|  | initial tensile resistance [cN/dtex] | 29 | 40 | 22 | 24 | 25 | 24 | 25 | 26 |
|  | average fiber diameter [μm] | 19.6 | 19.8 | 18.4 | 19.2 | 20.2 | 19.7 | 19.9 | 19.6 |
|  | dispersion diameter of island component [μm] | 0.89 | 0.45 | 1.72 | 1.36 | 0.37 | 2.65 | 1.33 | 0.33 |
|  | coefficient of variation CV of dispersion diameter of island component [%] | 31 | 27 | 43 | 37 | 25 | 8 | 12 | 19 |
|  | specific gravity | 0.92 | 0.92 | 1.05 | 0.96 | 0.87 | 0.92 | 0.92 | 0.92 |
|  | L* value | 32 | 27 | 27 | 30 | 42 | 45 | 37 | 24 |
| fabric characteristics of polymethylpentene conjugate fiber | lightweight property | ◎ | ◎ | ○ | ◎ | ◎ | ◎ | ◎ | ◎ |
|  | color developing property | ◎ | ◎ | ◎ | ◎ | ○ | ○ | ◎ | ◎ |
|  | washing fastness | ◎ | ◎ | ○ | ◎ | ◎ | ◎ | ◎ | ◎ |
|  | rubbing fastness | ◎ | ◎ | ○ | ◎ | ◎ | ◎ | ◎ | ◎ |
|  | light fastness | ◎ | ◎ | ○ | ◎ | ◎ | ◎ | ◎ | ◎ |

PMP: polymethylpentene
PLA: polylactic acid

TABLE 2

|  |  | Example 9 | Example 10 | Example 11 | Example 12 | Example 13 | Example 14 | Example 15 | Example 16 |
|---|---|---|---|---|---|---|---|---|---|
| sea-island conjugate production conditions | sea component (a) | PMP | PMP | PMP | PMP | PMP | PMP | PMP | PMP |
|  | island component (b) | PET | PPT | N6 | N66 | PMMA | MPP | CAP | CDA |
|  | Sea/island/compatibilizer [weight ratio] | 80/20/0 | 80/20/0 | 80/20/0 | 80/20/0 | 80/20/0 | 80/20/0 | 80/20/0 | 80/20/0 |
|  | sea-island melt viscosity ratio ($\eta b/\eta a$) | 2.2 | 3.7 | 1.8 | 0.4 | 2.5 | 1.1 | 1.2 | 2.4 |
|  | sea-island structure formed method | alloy type | alloy type | alloy type | alloy type | alloy type | alloy type | alloy type | alloy type |
| fiber characteristics of polymethylpentene conjugate fiber | fineness [dtex] | 100 | 100 | 100 | 100 | 100 | 100 | 100 | 100 |
|  | strength [cN/dtex] | 3.2 | 2.1 | 3.0 | 3.1 | 2.9 | 1.9 | 1.6 | 1.8 |
|  | elongation percentage [%] | 21 | 30 | 28 | 26 | 25 | 35 | 21 | 24 |
|  | initial tensile resistance [cN/dtex] | 43 | 26 | 18 | 27 | 26 | 33 | 23 | 26 |
|  | average fiber diameter [μm] | 19.4 | 19.5 | 20.0 | 19.9 | 19.8 | 20.5 | 19.8 | 19.4 |
|  | dispersion diameter of island component [μm] | 1.40 | 1.85 | 1.17 | 0.98 | 1.67 | 0.19 | 0.51 | 1.52 |
|  | coefficient of variation CV of dispersion diameter of island component [%] | 34 | 45 | 29 | 31 | 39 | 21 | 23 | 36 |
|  | specific gravity | 0.94 | 0.93 | 0.89 | 0.89 | 0.90 | 0.85 | 0.92 | 0.93 |
|  | L* value | 45 | 47 | 43 | 39 | 43 | 23 | 25 | 41 |

TABLE 2-continued

|  |  | Example 9 | Example 10 | Example 11 | Example 12 | Example 13 | Example 14 | Example 15 | Example 16 |
|---|---|---|---|---|---|---|---|---|---|
| fabric characteristics of polymethylpentene conjugate fiber | lightweight property | ◉ | ◉ | ◉ | ◉ | ◉ | ◉ | ◉ | ◉ |
|  | color developing property | ○ | ○ | ○ | ◉ | ○ | ◉ | ◉ | ○ |
|  | washing fastness | ◉ | ◉ | ◉ | ◉ | ◉ | ◉ | ◉ | ◉ |
|  | rubbing fastness | ◉ | ◉ | ◉ | ◉ | ◉ | ◉ | ◉ | ◉ |
|  | light fastness | ◉ | ◉ | ○ | ○ | ◉ | ◉ | ◉ | ◉ |

PMP: polymethylpentene
PET: polyethylene terephthalate
PPT: polypropylene terephthalate
N6: nylon 6
N66: nylon 66
PMMA: polymethyl-methacrylate
MPP: maleic anhydride modified polypropylene
CAP: cellulose acetate propionate
CDA: cellulose diacetate

TABLE 3

|  |  | Comparative example 1 | Comparative example 2 | Comparative example 3 | Comparative example 4 | Comparative example 5 | Comparative example 6 |
|---|---|---|---|---|---|---|---|
| sea-island conjugate production conditions | sea component (a) | PMP | PMP | PMP | PMP | HDPE | PP |
|  | island component (b) | — | PLA | PLA | PLA | EVA | EVA |
|  | sea/island/compatibilizer [weight ratio] | — | 80/20/0 | 50/50/0 | 20/80/0 | 80/20/0 | 80/20/0 |
|  | sea-island melt viscosity ratio ($\eta b/\eta a$) | — | 1.7 | 1.7 | 1.7 | 2.8 | 2.3 |
|  | sea-island structure formed method | monocomponent | core-sheath | core-sheath | core-sheath | alloy type | alloy type |
| fiber characteristics of polymethylpentene conjugate fiber | fineness [dtex] | 100 | 100 | 100 | 100 | 100 | 100 |
|  | strength [cN/dtex] | 2.5 | 2.3 | 1.5 | 2.4 | 0.5 | 0.7 |
|  | elongation percentage [%] | 25 | 25 | 28 | 34 | 597 | 554 |
|  | initial tensile resistance [cN/dtex] | 32 | 35 | 26 | 30 | 13 | 15 |
|  | average fiber diameter [μm] | 20.6 | 19.7 | 18.3 | 17.5 | 19.3 | 19.6 |
|  | dispersion diameter of island component [μm] | — | 7.51 | 11.9 | 15.0 | 1.67 | 1.49 |
|  | coefficient of variation CV of dispersion diameter of island component [%] | — | 10 | 13 | 17 | 42 | 35 |
|  | specific gravity | 0.83 | 0.92 | 1.05 | 1.18 | 0.98 | 0.95 |
|  | L* value | 65 | 57 | 53 | 51 | 63 | 61 |
| fabric characteristics of polymethylpentene conjugate fiber | lightweight property | ◉ | ◉ | ○ | Δ | ◉ | ◉ |
|  | color developing property | X | Δ | Δ | Δ | X | X |
|  | washing fastness | ◉ | ◉ | ○ | Δ | Δ | Δ |
|  | rubbing fastness | ◉ | ◉ | ○ | Δ | Δ | Δ |
|  | light fastness | ◉ | ◉ | ○ | Δ | Δ | Δ |

PMP: polymethylpentene
PLA: polylactic acid
HDPE: high density polyethylene
EVA: ethylene-vinyl acetate copolymer
PP: polypropylene

TABLE 4

|  |  | Example 17 | Example 18 | Example 19 | Example 20 | Example 21 | Example 22 |
|---|---|---|---|---|---|---|---|
| sea-island conjugate production conditions | sea component (a) | PMP | PMP | PMP | PMP | PMP | PMP |
|  | island component (b) | PLA | PLA | PLA | PLA | PLA | PLA |
|  | sea-island/compatibilizer [weight ratio] | 80/15/5 | 50/45/5 | 70/25/5 | 90/8/2 | 80/20/0 | 80/20/0 |
|  | melt viscosity ratio ($\eta b/\eta a$) | 1.7 | 1.7 | 1.7 | 1.7 | 1.1 | 1.7 |
|  | sea-island structure formation method | alloy type | alloy type | alloy type | alloy type | alloy type | sea-island |
| fiber characteristics of polymethylpentene | fineness [dtex] (before dissolving out the island component) | 100 | 100 | 100 | 100 | 100 | 100 |
|  | fineness [dtex] (after dissolving out the island component) | 79 | 45 | 66 | 88 | 72 | 72 |

TABLE 4-continued

|  |  | Example 17 | Example 18 | Example 19 | Example 20 | Example 21 | Example 22 |
|---|---|---|---|---|---|---|---|
| porous fiber | strength [cN/dtex] | 2.0 | 1.5 | 1.9 | 3.2 | 1.8 | 2.2 |
|  | elongation percentage [%] | 50 | 42 | 49 | 62 | 20 | 82 |
|  | initial tensile resistance [cN/dtex] | 23 | 15 | 22 | 25 | 40 | 11 |
|  | content of remaining thermoplastic resin [%] | 0 | 0 | 0 | 0 | 0 | 0 |
|  | average fiber diameter [μm] | 31.2 | 29.7 | 30.8 | 32.1 | 30.9 | 30.6 |
|  | average pore diameter [μm] | 0.89 | 1.72 | 1.36 | 0.37 | 0.91 | 1.50 |
|  | coefficient of variation CV of pore diameter [%] | 33 | 48 | 39 | 25 | 34 | 17 |
|  | porosity [%] | 16 | 45 | 24 | 8 | 19 | 20 |
|  | specific gravity | 0.73 | 0.48 | 0.64 | 0.77 | 0.68 | 0.68 |
|  | specific gravity increase rate [%] | 1.3 | 7.9 | 2.3 | 0.2 | 3.4 | 8.1 |
|  | lightweight property | ○ | ◎ | ◎ | ○ | ◎ | ◎ |
|  | hollow resistance | ◎ | ○ | ◎ | ◎ | ◎ | ○ |

PMP: polymethylpentene
PLA: polylactic acid

TABLE 5

|  |  | Example 23 | Example 24 | Example 25 | Example 26 | Example 27 |
|---|---|---|---|---|---|---|
| sea-island conjugate production conditions | sea component (a) | PMP | PMP | PMP | PMP | PMP |
|  | island component (b) | PET | copolymerized PET | N6 | PMMA | CAP |
|  | sea-island/compatibilizer [weight ratio] | 80/20/0 | 80/20/0 | 80/20/0 | 80/20/0 | 80/20/0 |
|  | melt viscosity ratio (ηb/ηa) | 1.5 | 1.3 | 1.8 | 2.5 | 1.2 |
|  | sea-island structure formation method | alloy type | alloy type | alloy type | alloy type | alloy type |
| fiber characteristics of polymethyl-pentene porous fiber | fineness [dtex] (before dissolving out the island component) | 100 | 100 | 100 | 100 | 100 |
|  | fineness [dtex] (after dissolving out the island component) | 71 | 71 | 74 | 74 | 72 |
|  | strength [cN/dtex] | 1.6 | 1.7 | 1.7 | 1.3 | 1.5 |
|  | elongation percentage [%] | 25 | 23 | 22 | 19 | 24 |
|  | initial tensile resistance [cN/dtex] | 35 | 39 | 43 | 30 | 27 |
|  | content of remaining thermoplastic resin [%] | 0 | 0 | 0 | 0 | 0 |
|  | average fiber diameter [μm] | 30.6 | 30.8 | 31.2 | 30.5 | 31.0 |
|  | average pore diameter [μm] | 1.35 | 1.29 | 1.22 | 1.65 | 0.49 |
|  | coefficient of variation CV of pore diameter [%] | 36 | 32 | 34 | 45 | 28 |
|  | porosity [%] | 19 | 20 | 20 | 21 | 19 |
|  | specific gravity | 0.66 | 0.67 | 0.65 | 0.68 | 0.64 |
|  | specific gravity increase rate [%] | 2.6 | 1.9 | 2.1 | 6.9 | 1.1 |
|  | lightweight property | ◎ | ◎ | ◎ | ◎ | ◎ |
|  | hollow resistance | ◎ | ◎ | ◎ | ○ | ◎ |

|  |  | Example 28 | Example 29 | Example 30 | Example 31 | Example 32 |
|---|---|---|---|---|---|---|
| sea-island conjugate production conditions | sea component (a) | PMP | PMP | PMP | PMP | PMP |
|  | island component (b) | CDA | HPMC | PVA | PEO | PS |
|  | sea-island/compatibilizer [weight ratio] | 80/20/0 | 80/20/0 | 80/20/0 | 80/20/0 | 80/20/0 |
|  | melt viscosity ratio (ηb/ηa) | 2.4 | 1.5 | 1.3 | 1.1 | 1.9 |
|  | sea-island structure formation method | alloy type | alloy type | alloy type | alloy type | alloy type |
| fiber characteristics of polymethyl-pentene porous fiber | fineness [dtex] (before dissolving out the island component) | 100 | 100 | 100 | 100 | 100 |
|  | fineness [dtex] (after dissolving out the island component) | 72 | 70 | 73 | 73 | 76 |
|  | strength [cN/dtex] | 1.4 | 1.4 | 1.4 | 1.3 | 1.8 |
|  | elongation percentage [%] | 23 | 22 | 20 | 18 | 26 |
|  | initial tensile resistance [cN/dtex] | 25 | 22 | 23 | 25 | 40 |
|  | content of remaining thermoplastic resin [%] | 0 | 0 | 0 | 0 | 0 |
|  | average fiber diameter [μm] | 31.5 | 30.7 | 31.4 | 31.9 | 32.7 |
|  | average pore diameter [μm] | 1.55 | 1.63 | 1.75 | 1.80 | 0.25 |
|  | coefficient of variation CV of pore diameter [%] | 39 | 49 | 41 | 53 | 19 |
|  | porosity [%] | 20 | 19 | 20 | 21 | 19 |
|  | specific gravity | 0.65 | 0.64 | 0.66 | 0.64 | 0.65 |

TABLE 5-continued

|  |  |  |  |  |  |
|---|---|---|---|---|---|
| specific gravity increase rate [%] | 7.3 | 7.2 | 7.5 | 8.9 | 0.4 |
| lightweight property | ◎ | ◎ | ◎ | ◎ | ◎ |
| hollow resistance | ○ | ○ | ○ | ○ | ◎ |

PMP: polymethylpentene
PET: polyethylene terephthalate
N6: nylon 6
PMMA: polymethyl-methacrylate
CAP: cellulose acetate propionate
CDA: cellulose diacetate
HPMC: hydroxypropyl methyl cellulose
PVA: polyvinyl alcohol
PEO: polyethylene oxide
PS: polystyrene

TABLE 6

| | | Example 33 | Example 34 | Example 35 | Example 36 | Example 37 | Example 38 | Example 39 | Example 40 |
|---|---|---|---|---|---|---|---|---|---|
| sea-island conjugate production conditions | sea component (a) | PMP | PMP | PMP | PMP | PMP | PMP | PMP | PMP |
| | island component (b) | PLA | PLA | PET | copoly-merized PET | N6 | PMMA | CAP | CDA |
| | sea-island/compatibilizer [weight ratio] | 80/20/0 | 80/20/0 | 80/20/0 | 80/20/0 | 80/20/0 | 80/20/0 | 80/20/0 | 80/20/0 |
| | melt viscosity ratio (ηb/ηa) | 1.1 | 1.1 | 1.5 | 1.3 | 1.8 | 2.5 | 1.2 | 2.4 |
| | sea-island structure formation method | alloy type | alloy type | alloy type | alloy type | alloy type | alloy type | alloy type | alloy type |
| fiber characteristics of polymethyl-pentene porous fiber | fineness [dtex] (before dissolving out the island component) | 100 | 100 | 100 | 100 | 100 | 100 | 100 | 100 |
| | fineness [dtex] (after dissolving out the island component) | 79 | 86 | 85 | 81 | 88 | 84 | 78 | 80 |
| | strength [cN/dtex] | 2.0 | 2.1 | 2.1 | 2.0 | 2.1 | 1.5 | 1.7 | 1.6 |
| | elongation percentage [%] | 26 | 26 | 32 | 28 | 30 | 23 | 28 | 26 |
| | initial tensile resistance [cN/dtex] | 44 | 46 | 43 | 45 | 50 | 35 | 30 | 29 |
| | content of remaining thermoplastic resin [%] | 5 | 10 | 10 | 7 | 11 | 8 | 4 | 6 |
| | average fiber diameter [μm] | 31.3 | 30.7 | 30.8 | 30.5 | 31.5 | 30.1 | 31.4 | 30.3 |
| | average pore diameter [μm] | 0.81 | 0.72 | 1.10 | 1.12 | 0.97 | 1.35 | 0.45 | 1.40 |
| | coefficient of variation CV of pore diameter [%] | 29 | 27 | 33 | 29 | 25 | 37 | 26 | 36 |
| | porosity [%] | 14 | 10 | 11 | 13 | 10 | 11 | 15 | 15 |
| | specific gravity | 0.73 | 0.79 | 0.79 | 0.76 | 0.79 | 0.76 | 0.72 | 0.74 |
| | specific gravity increase rate [%] | 3.2 | 2.7 | 3.8 | 4.1 | 3.5 | 2.6 | 0.9 | 4.7 |
| | L* value | 42 | 37 | 49 | 51 | 48 | 49 | 38 | 54 |
| | lightweight property | ○ | ○ | ○ | ○ | ○ | ○ | ○ | ○ |
| | hollow resistance | ◎ | ◎ | ◎ | ◎ | ◎ | ◎ | ◎ | ◎ |
| | color developing property | ○ | ◎ | ○ | ○ | ○ | ○ | ◎ | ○ |
| | levelness of dyeing | ◎ | ◎ | ○ | ◎ | ◎ | ○ | ◎ | ○ |
| | dyeing specks | ○ | ◎ | ◎ | ◎ | ◎ | ○ | ○ | ○ |

PMP: polymethylpentene
PLA: polylactic acid
PET: polyethylene terephthalate
N6: nylon 6
PMMA: polymethyl-methacrylate
CAP: cellulose acetate propionate
CDA: cellulose diacetate

TABLE 7

| | | Comparative example 7 | Comparative example 8 | Comparative example 9 | Comparative example 10 | Comparative example 11 | Comparative example 12 |
|---|---|---|---|---|---|---|---|
| sea-island conjugate production conditions | sea component (a) | PMP | PMP | PMP | PMP | HDPE | PP |
| | island component (b) | — | — | — | — | EVA | EVA |
| | sea-island/compatibilizer [weight ratio] | 100/0/0 | 100/0/0 | 100/0/0 | 100/0/0 | 80/20/0 | 80/20/0 |
| | melt viscosity ratio (ηb/ηa) | — | — | — | — | 2.8 | 2.3 |
| | sea-island structure formation method | monocomponent | monocomponent | hollow type | hollow type | alloy type | alloy type |

TABLE 7-continued

| | | Comparative example 7 | Comparative example 8 | Comparative example 9 | Comparative example 10 | Comparative example 11 | Comparative example 12 |
|---|---|---|---|---|---|---|---|
| fiber characteristics of polymethyl-pentene porous fiber | fineness [dtex] | 100 | 94 | 63 | 57 | 26 | 24 |
| | strength [cN/dtex] | 2.7 | 2.9 | 2.1 | 0.8 | 3.7 | 4.5 |
| | elongation percentage [%] | 46 | 40 | 25 | 11 | 48 | 45 |
| | initial tensile resistance [cN/dtex] | 24 | 27 | 22 | 52 | 27 | 31 |
| | average fiber diameter [μm] | 22.5 | 21.8 | 25.4 | 23.9 | 8.6 | 8.8 |
| | average pore diameter [μm] | — | 0.50 | (8.7) | 0.42 | 0.95 | 0.91 |
| | coefficient of variation CV of pore diameter [%] | — | 80 | (15) | 65 | 76 | 73 |
| | porosity [%] | — | 5 | 20 | 28 | 61 | 57 |
| | specific gravity | 0.83 | 0.78 | 0.66 | 0.60 | 0.38 | 0.41 |
| | specific gravity increase rate [%] | 0.0 | 12.1 | 19.0 | 24.7 | 82.1 | 79.6 |
| | lightweight property | X | ○ | ◎ | ◎ | ◎ | ◎ |
| | hollow resistance | — | X | X | X | X | X |

PMP: polymethylpentene
HDPE: high density polyethylene
EVA: ethylene-vinyl acetate copolymer
PP: polypropylene

INDUSTRIAL APPLICABILITY

The polymethylpentene conjugate fiber according to the present invention includes lightweight polymethylpentene fiber having deep, vivid color developing property. Furthermore, the porous polymethylpentene fiber according to the present invention is very light in weight, highly uniform in pore diameter, and high in pore resistance to external force. Accordingly, the polymethylpentene conjugate fiber and porous polymethylpentene fiber that can be obtained according to the present invention can be adopted favorably as fiber structures such as woven and knitted fabrics, nonwoven fabrics, spun yarns, and wadding.

EXPLANATION OF NUMERALS

1: porous fiber
2: pores

The invention claimed is:

1. Polymethylpentene conjugate fiber having a sea-island structure comprising polymethylpentene based resin as sea component and thermoplastic resin as island component.

2. Polymethylpentene conjugate fiber as set forth in claim 1, wherein the thermoplastic resin of the island component comprises one or more compounds selected from the group consisting of polyester, polyamide, thermoplastic polyacrylonitrile, thermoplastic polyurethane, and cellulose derivatives.

3. Polymethylpentene conjugate fiber as set forth in claim 1, wherein the coefficient of variation CV of the dispersion diameter of the island domains in a fiber cross section is 1 to 50%.

4. Polymethylpentene conjugate fiber as set forth in claim 1, wherein the content ratio (by weight) of the sea component to the island component is 20/80 to 99/1.

5. Polymethylpentene conjugate fiber as set forth in claim 1, wherein the dispersion diameter of the island domains in a fiber cross section is 0.001 to 2 μm.

6. Polymethylpentene conjugate fiber as set forth in claim 1, wherein the specific gravity of the fiber is 0.83 to 1.1.

7. Porous polymethylpentene fiber comprising polymethylpentene based resin and having a coefficient of variation CV of the pore diameter in a fiber cross section of 1 to 50%.

8. Porous polymethylpentene fiber as set forth in claim 7, wherein the average diameter of the pores in a fiber cross section is 0.001 to 2 μm.

9. Porous polymethylpentene fiber as set forth in claim 7, wherein the porosity of the fiber is 0.1 to 70%.

10. Porous polymethylpentene fiber as set forth in claim 7, wherein the specific gravity of the fiber is 0.25 to 0.80.

11. A fiber structure comprising, at least partially, polymethylpentene conjugate fiber as set forth in claim 1.

12. A production method for porous polymethylpentene fiber as set forth in claim 7 comprising a step for dissolving out at least part of the island component from the polymethylpentene conjugate fiber having a sea-island structure comprising polymethylpentene based resin as sea component and thermoplastic resin as island component.

13. Polymethylpentene conjugate fiber as set forth in claim 2, wherein the coefficient of variation CV of the dispersion diameter of the island domains in a fiber cross section is 1 to 50%.

14. Polymethylpentene conjugate fiber as set forth in claim 2, wherein the content ratio (by weight) of the sea component to the island component is 20/80 to 99/1.

15. Polymethylpentene conjugate fiber as set forth in claim 3, wherein the content ratio (by weight) of the sea component to the island component is 20/80 to 99/1.

16. Polymethylpentene conjugate fiber as set forth in claim 2, wherein the dispersion diameter of the island domains in a fiber cross section is 0.001 to 2 μm.

17. Polymethylpentene conjugate fiber as set forth in claim 3, wherein the dispersion diameter of the island domains in a fiber cross section is 0.001 to 2 μm.

18. Polymethylpentene conjugate fiber as set forth in claim 4, wherein the dispersion diameter of the island domains in a fiber cross section is 0.001 to 2 μm.

19. Polymethylpentene conjugate fiber as set forth in claim 2, wherein the specific gravity of the fiber is 0.83 to 1.1.

20. Polymethylpentene conjugate fiber as set forth in claim 3, wherein the specific gravity of the fiber is 0.83 to 1.1.

* * * * *